United States Patent [19]
Fujii et al.

[11] Patent Number: 6,091,844
[45] Date of Patent: *Jul. 18, 2000

[54] IMAGE PROCESSING DEVICE AND METHOD FOR IDENTIFYING AN INPUT IMAGE AND COPIER INCLUDING SAME

[75] Inventors: Tooru Fujii; Genki Yotsui; Tomohiko Hayakawa; Shinya Sonoda; Yoshinori Yamaguchi; Kouichi Oomae, all of Kyoto-fu, Japan

[73] Assignee: Omron Corporation, Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/915,473

[22] Filed: Aug. 20, 1997

Related U.S. Application Data

[63] Continuation of application No. 08/321,651, Oct. 11, 1994, abandoned.

[30] Foreign Application Priority Data

Oct. 14, 1993 [JP] Japan .................................. 5-281821

[51] Int. Cl.[7] ....................................................... G06K 9/00
[52] U.S. Cl. ......................... 382/135; 382/165; 382/218; 382/227
[58] Field of Search ...................................... 382/135, 165, 382/216, 220, 218, 292, 100, 227; 355/201

[56] References Cited

U.S. PATENT DOCUMENTS

| | | | |
|---|---|---|---|
| 4,611,345 | 9/1986 | Ohnishi et al. | 382/135 |
| 5,216,724 | 6/1993 | Suzuki et al. | 382/165 |
| 5,321,470 | 6/1994 | Hasuo et al. | 382/135 |
| 5,410,613 | 4/1995 | Suzuki et al. | 382/203 |
| 5,436,493 | 7/1995 | Mantell | 257/440 |
| 5,437,357 | 8/1995 | Ota et al. | 382/135 |
| 5,479,533 | 12/1995 | Tanaka | 382/161 |
| 5,502,575 | 3/1996 | Kai et al. | 382/135 |

FOREIGN PATENT DOCUMENTS 2148383  7/1990  Japan .

*Primary Examiner*—Yon J. Couso
*Attorney, Agent, or Firm*—Dickstein Shapiro Morin & Oshinsky LLP

[57] ABSTRACT

An image processing device and method for identifying an input image and a copier including such an image processing device and method. The image processing device forms a gradated image from the input image, determines whether the gradated image includes a specified pattern, extracts a portion of the input image corresponding to the specified pattern, and compares the extracted portion of the input image with a reference pattern to determine a degree of resemblance between the extracted portion of the input image and the reference pattern.

16 Claims, 29 Drawing Sheets

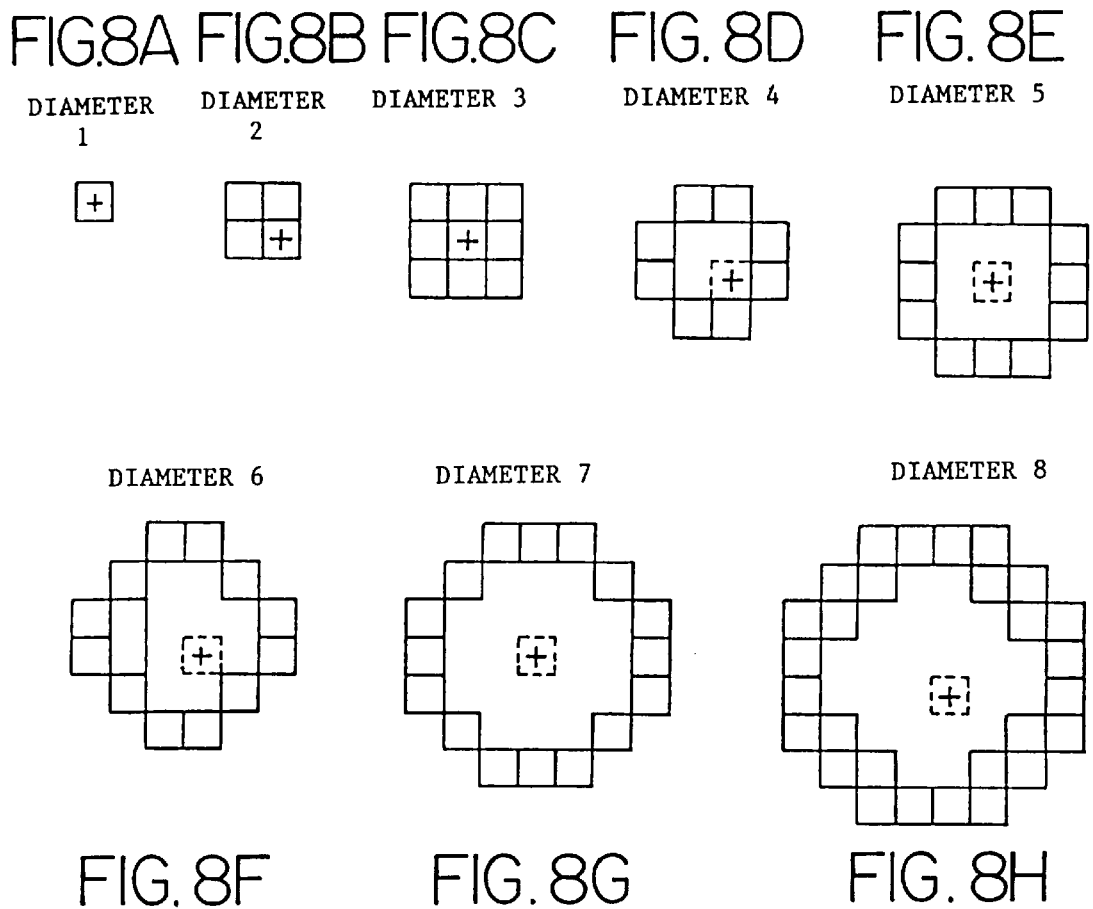
FIG. 8A FIG. 8B FIG. 8C FIG. 8D FIG. 8E
DIAMETER 1, DIAMETER 2, DIAMETER 3, DIAMETER 4, DIAMETER 5
DIAMETER 6, DIAMETER 7, DIAMETER 8
FIG. 8F  FIG. 8G  FIG. 8H
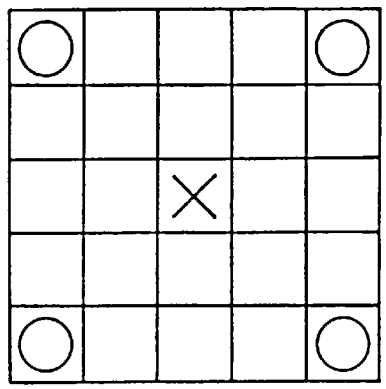
FIG. 9A
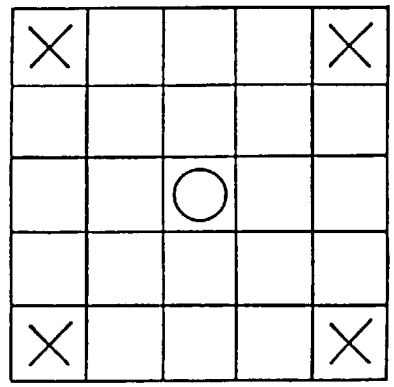
FIG. 9B

FIG. 14

CIRCULAR PATTERN

(1) →

- ORIGIN AND COORDINATES OF 4 LINES ARE ESTABLISHED — ST 11
- CONSTANT IS ESTABLISHED — ST 12
- ST 13: HAS DETECTION BEEN COMPLETED IN 4 REGIONS?
  - YES → (to ST 17)
  - NO ↓
    - REGION IS ESTABLISHED — ST 14
    - HISTOGRAM IS CREATED — ST 15
    - BORDER IS DETECTED — ST 16
    - (loop back to ST 13)
- CENTERPOINT OF BORDER IS DETECTED — ST 17
- ST 18: WAS CALCULATION SUCCESSFUL?
  - NO → (2)
  - YES ↓
    - POSITION IS OUTPUT — ST 19
- (2)

FIG. 16A
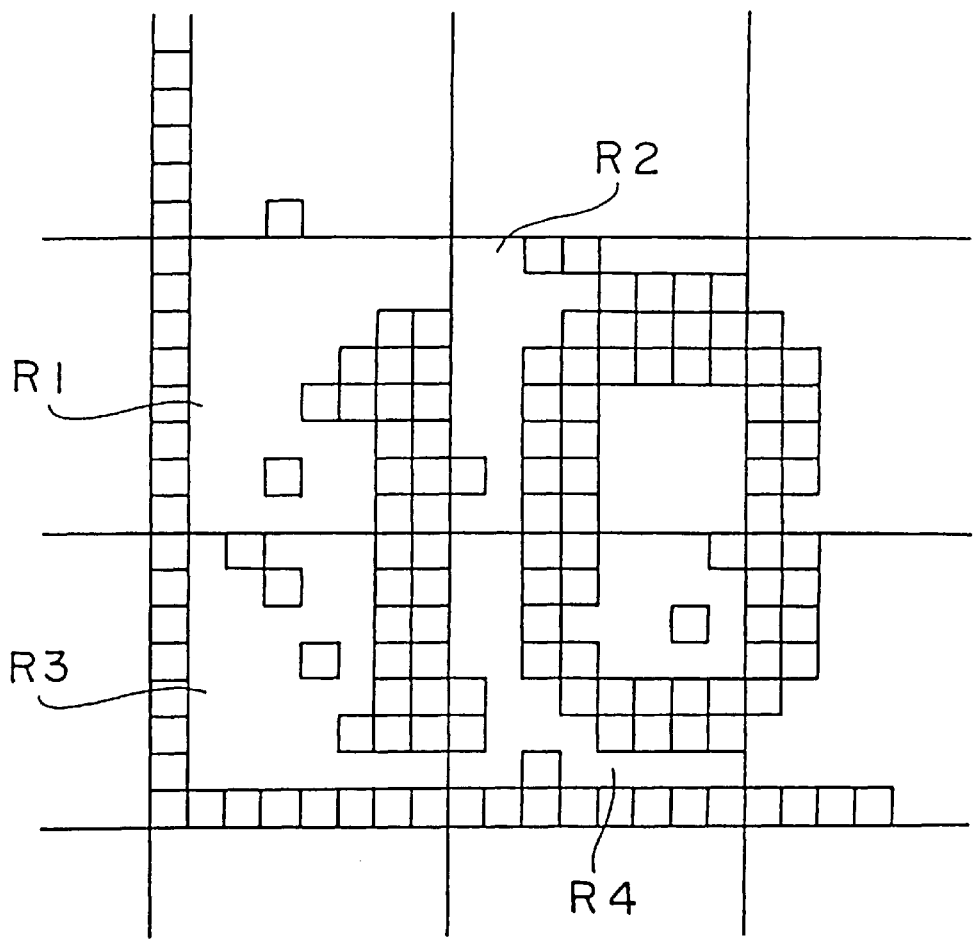
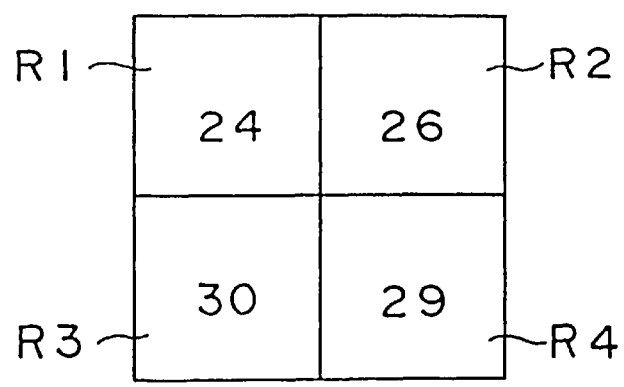
FIG. 16B

FIG. 17
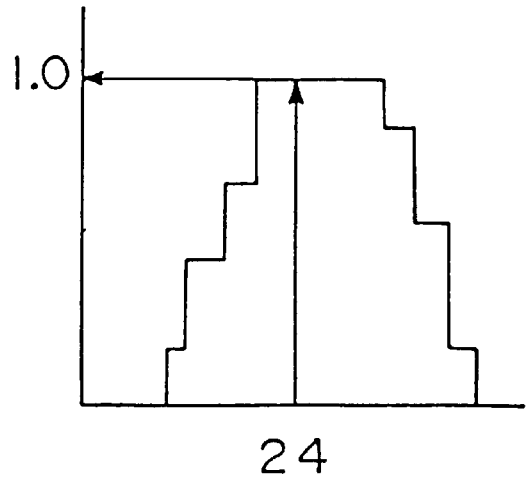
R1 MID-RANGE
24
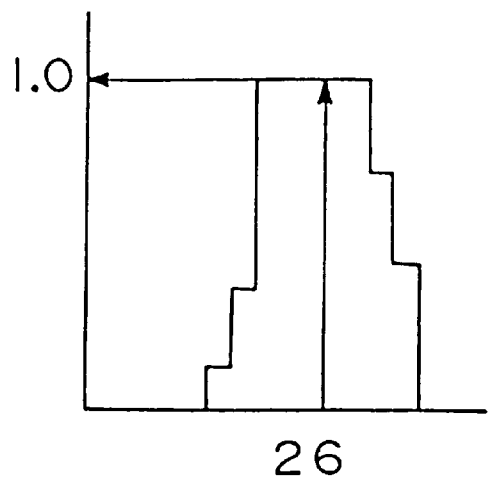
R2 MID-RANGE
26
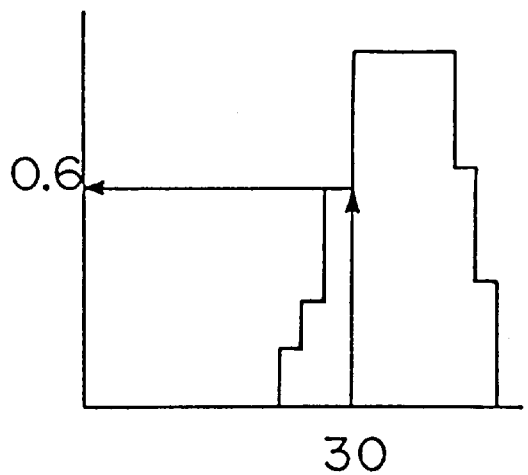
R3 LARGE
30
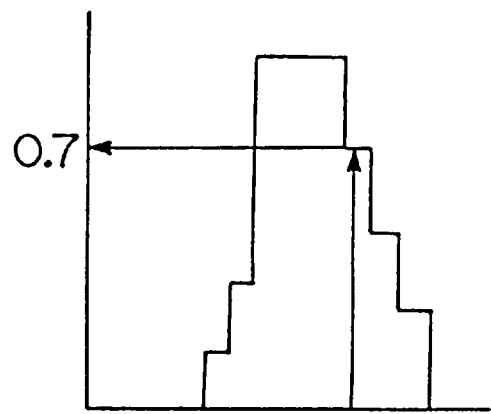
R4 MID-RANGE
29
MEMBERSHIP FUNCTIONS
EXAMPLES OF RULES
IF CHARACTERISTIC COUNT 1 IS IN THE MID-RANGE
   CHARACTERISTIC COUNT 2 IS IN THE MID-RANGE,
   CHARACTERISTIC COUNT 3 IS LARGE
AND CHARACTERISTIC COUNT 4 IS IN THE MID-RANGE,
THE PATTERN IS IDENTICAL TO THE REFERENCE PATTERN.

CHARACTERISTICS IN R DATA

CHARACTERISTICS IN G DATA

CHARACTERISTICS IN B DATA

1. R1. 85%, x r 0, y r 0,    (①)    (R2, -------------)
1. G1. 75%, x g 0, y g 0,    (③)    (G2, -------------)
1. B1. 80%, x b 0, y b 0,    (④)    (B2, -------------)

IMAGE PROCESSING DEVICE AND METHOD FOR IDENTIFYING AN INPUT IMAGE AND COPIER INCLUDING SAME

This application is a continuation of application No. 08/321,651 filed Oct. 11, 1994, now abandoned.

BACKGROUND OF THE INVENTION

1. Field of the Invention

This invention relates to an image processing device and method and, in particular, to an image processing device and method for preventing the counterfeiting of bank notes, negotiable securities, and the like. The invention also relates to a copier including such an image processing device and method.

2. Description of the Related Art

The development in recent years of copying devices such as full-color copiers has enhanced the quality of reproduction to a level at which one cannot distinguish the copy from the original with the naked eye. Such faithful reproductions can now be obtained inexpensively. However, we must consider that along with this benefit comes the increased risk of copiers being put to such illicit uses as counterfeiting money, negotiable securities, and other original documents whose reproduction is legally prohibited. To avert this danger, various devices have been developed to prevent copiers from being used for counterfeiting. One such device is the image processing device disclosed in Patent Report 2-210481.

That image processing device reads the original image placed on the glass of the copier by scanning the entire original four times. It is used in full-color digital copy machines. Let us assume that a bank note has been loaded into the copy machine. On the first scan, the device detects the rough location of the watermark which identifies paper money, the item which the machine is to be prevented from copying, on the assumption that the document on the glass is, in fact, a bank note. On the second scan, the device detects the exact position of the bill and the angle at which it is placed, i.e., the exact position coordinates of the bill on the glass. On the third scan, the device calculates the position coordinates of the red seal stamped on the bill from the exact position of the bill obtained in the second scan. Based on these position coordinates, it extracts an image from the region in which the seal is placed, and it makes a judgment as to whether there is in fact a red seal on this item. By scanning the item several times, the device is able to detect whether or not the document loaded in the copier is one which it would be illegal to copy. If the device detects that a prohibited document such as a bank note has been loaded to be copied, it will perform its specified anti-counterfeiting operations on the fourth scan, such as making the entire display go black and preventing the copier from operating.

Since existing devices such as that described above require a number of scans to detect a bank note or other item which cannot be copied, arriving at a judgment is time-consuming. Furthermore, not all full-color copiers use a four-scan copying scheme like the one described above. Some scan the original three times, and others only once. The processing device described above cannot be used with these types of copiers. Another problem is that an extremely large memory capacity is needed merely to store data concerning the size of paper money. Inevitably, then, only a limited number of kinds of money can be detected.

SUMMARY OF THE INVENTION

In view of the difficulties discussed above, an objective of this invention is to provide an image processing device which is capable of detecting a bank note or other proscribed document by scanning it only once; which does not require a large memory capacity; which is capable of performing high-speed processing in real time; and which can be produced at a low cost. Another object of this invention is to provide a copier including such an image processing device.

To achieve the objectives outlined above, the image processing device of this invention is provided with a device to detect a pattern which resembles a specified pattern within image data which it has received; a device to extract this pattern, once detected, from the image data; and a device to calculate the degree of resemblance between the extracted pattern and a reference pattern which was established beforehand.

The device to detect a pattern has the ability to match a gradated pattern with the reference pattern which was established beforehand. The device to detect a pattern can comprise a device to match a gradated pattern with the reference pattern which was established beforehand and a device to select a pattern. This latter device outputs to a second pattern extraction device the results of the matching process performed by the matching device. These results comprise of the spatial relationships between the patterns detected by the matching device.

The device to extract a pattern from the image data is capable of detecting certain specified locations in the pattern which has been detected, such as the apex of a corner or the center of a circle. The device to calculate the degree of resemblance has a number of items of fuzzy knowledge whose creation was based on each of the reference patterns which were established beforehand. The calculation device performs fuzzy inferences using the relevant fuzzy knowledge.

The device to detect a pattern, the device to extract a pattern, and the device to calculate the degree of resemblance all use a surface sequence scheme to process each data set received for each color component. The image processing device also has a device to select as recognized patterns those which the calculating device has determined to have a high resemblance to the reference and to store position data concerning these recognized patterns in the storage unit; and a device to judge whether or not each of the recognized patterns is in the correct spatial relationship with the others based on the position data for the recognized patterns which are extracted from each set of data for each color component and stored. In this way the device can judge whether or not the image data obtained during processing comprise the specified pattern to be detected.

The device to calculate the degree of resemblance has a number of reference patterns corresponding to specified patterns which are found in various locations among the image data from which a single pattern is to be detected. The image processing device obtains the degree of resemblance of the reference patterns to the pattern extracted by the extraction device. It labels as a recognized pattern any pattern whose degree of resemblance to the reference pattern exceeds a given reference value. Based on the spatial relationship among the various recognized patterns which have been detected, it renders a judgment as to whether or not the image data being processed are those of the pattern to be detected.

The image processing system according to this invention generally operates as follows. The system forms a gradated image with lower resolution than the image for which it has received data. It performs a rough search of this gradated image and attempts to match it to a reference pattern. In this way it detects patterns which are possible matches for the specified pattern which is to be detected. It then transmits to a storage unit the image data concerning these possible matches. Finally, it renders a judgment as to whether each possible match which was detected is or is not the pattern which was specified. This judgment is based on the data which are stored in the storage unit independently of the image data which were read out previously and on the results of the rough search.

The copier according to this invention is equipped with any one of the image processing devices disclosed above. The image data output by a document reading device in the copier are input in parallel fashion to both the image processing device and a color signal converter. The image processing device renders a judgment as to whether or not the object being copied is an object which was specified ahead of time, such as a bank note. If the object is one which was specified in advance, a control signal is sent to a specified processing device in the copier to prevent the copying operation from proceeding.

In response to the image data which it receives, the device to detect a specified pattern forms a gradated image, at lower resolution, of the pattern which it is to detect. It performs a rough search of the image data and attempts to match any patterns it finds to the gradated image. In this way it detects patterns which are possible matches for the specified patterns which are to be detected. It then transmits the image data concerning these possible matches to the device to extract a specified pattern and stores them. Based on these stored image data, the device to extract a specified pattern extracts an image from a specified region independently of the processing performed during the rough search, and it transmits this image to a second device to match the specified pattern. This second device attempts to match this pattern and renders a judgment as to whether each possible match which was detected is or is not a pattern which was specified. Since the detection device extracts the rough candidates for matches, only a relatively small number of matching operations need be performed before the final pattern matching process is performed. And even though the image data are sent to the detection device one by one, the detection process can be performed without reference to the status of subsequent processing, i.e., without waiting for the results of that processing, because the data concerning the possible candidates for matching have been stored temporarily in the device to extract data. This allows the processing to be performed in real time and at high speed.

BRIEF DESCRIPTION OF THE DRAWINGS

FIG. 8 is a diagram illustrating the basic ring used by the search unit which looks for marks;

FIGS. 9(A)–9(B) are diagrams illustrating how the preliminary judgment unit works;

FIG. 14 is a flow chart illustrating the function of mark detection in the position detection unit;

FIGS. 16(A)–16(B) are diagrams illustrating how the device to match a specified pattern against a reference pattern works;

FIG. 17 are diagrams illustrating examples of rules and membership functions stored in the rule and MF memories in the device to match a specified pattern against a reference pattern;

DETAILED DESCRIPTION OF THE INVENTION

Figure 1:
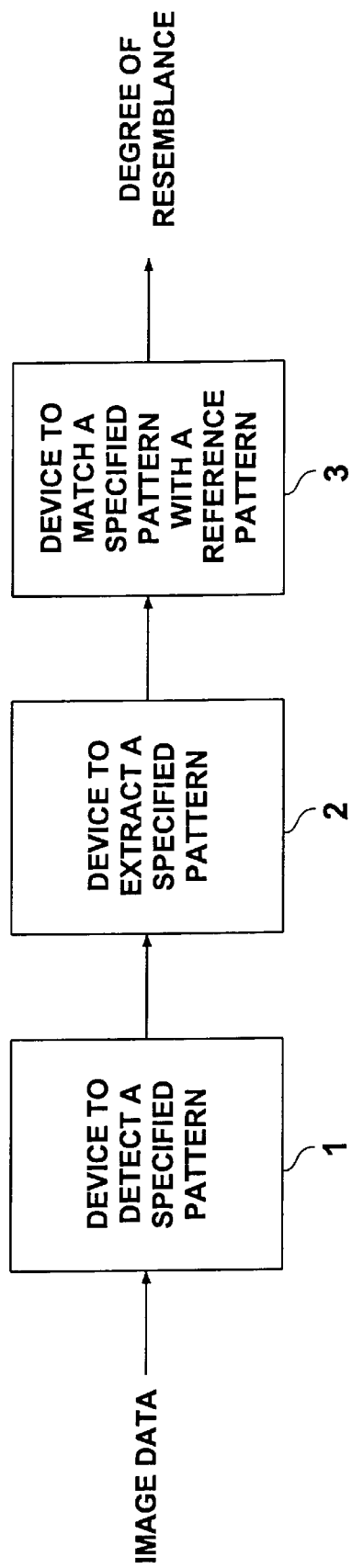
FIG. 1 is a block diagram of the overall configuration of an embodiment of the image processing device of this invention.

We shall next give a detailed explanation, with reference to the appended drawings, of a first embodiment of the image processing device and system and the copier in which these are used which are designed according to this invention. The processing device in this example is installed in a full-color copy machine. It is designed to detect paper money when someone attempts to copy it and prevent the copying process from proceeding to completion. First, as shown in FIG. 1, the image data read by the copier's image sensor are input into device 1, whose purpose is to detect a specified pattern. As these image data are scanned by an image sensor such as a CCD, they are transmitted successively, region by region, to device 1. The actual data which are sent are full color data for each of the red (R), green (G) and blue (B) components, with resolution of 400DPI.

Detection device 1 compresses the image data it has received to form a gradated image. Using masks of specified sizes, it checks the area of this image for patterns which are possible matches with each specified pattern which is to be detected, e.g., a mark, figure, etc. If it detects a possible candidate, it roughly specifies a reference position, e.g., the center for a circle, the apex of a corner for a rectangle, etc., for it and transmits the relevant data to device 2, the device to extract a specified pattern.

Extraction device 2 detects these reference positions more precisely, based on the image data before they were compressed. These data include the potential matches detected during the rough search. Device 2 also creates patterns to be used for comparison in the pattern matching process to be performed later. Potential matches are stored temporarily in a specified storage area in device 2. Extraction device 2 makes a preliminary judgment as to whether the extracted patterns resemble each specified pattern to be detected, based on the detailed, non-compressed image. If it finds a pattern similar to a specified pattern, it extracts the portion of it which surrounds the reference position and transmits this portion to device 3, where it will be matched against the specified pattern to be detected.

Device 3 uses fuzzy pattern matching logic to determine the degree of fit between each extracted pattern and its reference pattern, i.e., the specified pattern to be detected, and it judges whether this pattern is, in fact, the one which was being sought. If it is, device 3 outputs a specified control signal.

In this example, then, a rough search is made of the data read by the copier in its normal fashion. In this rough search, the gradated data are matched one by one against a pattern which was synthesized from the reference pattern, and potential candidates for a match are extracted. The data concerning these potential matches are stored in a storage area, and they are matched against the reference pattern by means of fuzzy inferences when the specified processing sequence has been completed. Each potential match is judged as to whether it is, in fact, the pattern being sought. Matching device 3 uses for comparative purposes a detailed image which approximates the original image. Before an attempt is made to match candidates to this detailed image, their number has been reduced by conducting a rough search at high speed. It should be appreciated that candidates can be evaluated swiftly and accurately when judgments are based on gradated image data. All processing is performed at high speed in real time. There is no need to temporarily interrupt one process while another is being carried out. The image can continue to be read, for example, or a rough search can be performed, while judgments are being processed.

In this section we shall discuss exemplary configurations of each device referred to above. Device 1, which detects a specified pattern, is pictured as a block diagram in FIG. 2. Here we see that the image data are sent to averaging unit 10, where a specified number of neighboring pixels in the relevant data are combined to form larger units. The density of the pixels in each unit is averaged to create a gradated image consisting, as it were, of rather larger pixels.

Figure 3:
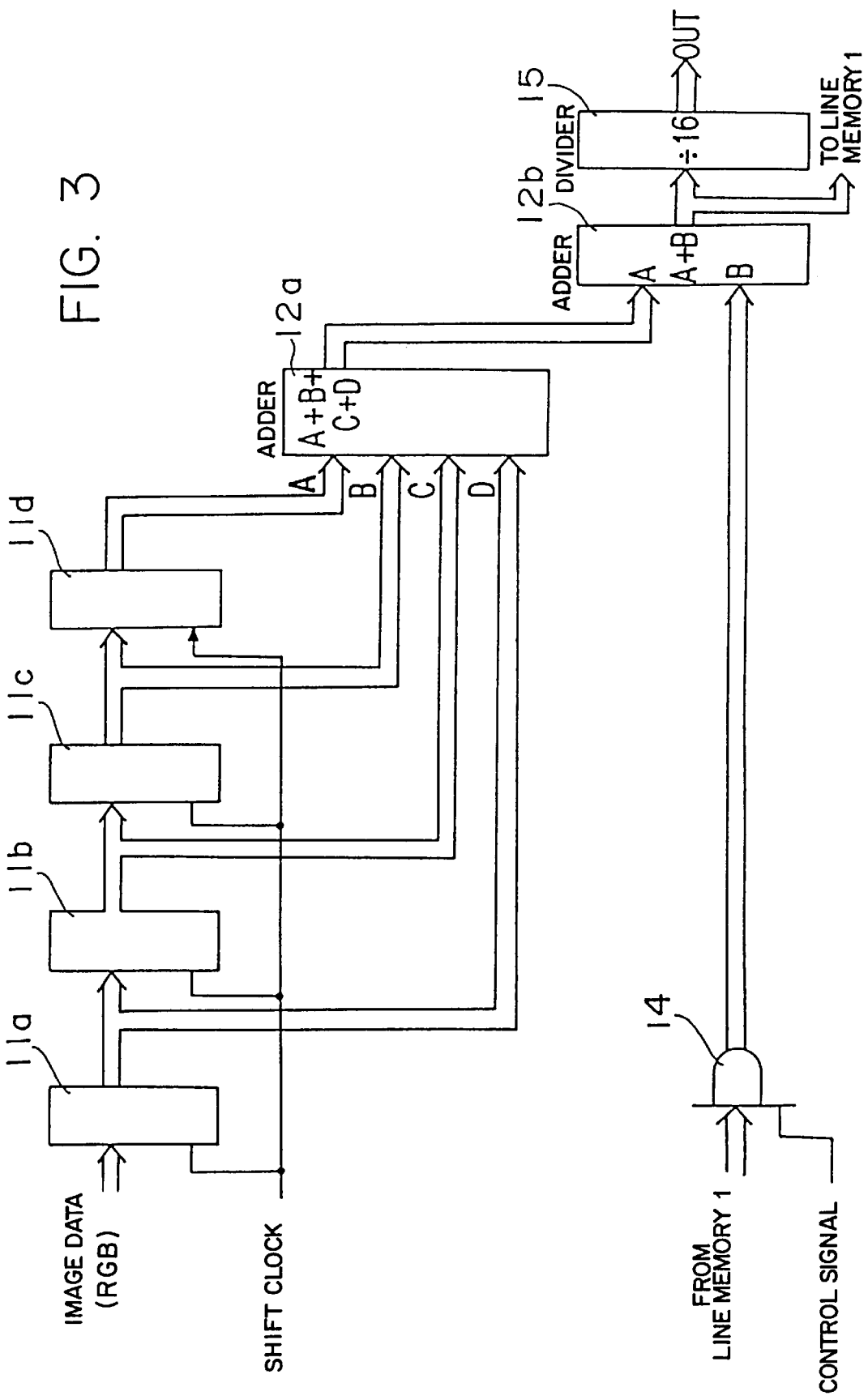
FIG. 3 is a block diagram of the internal structure of the device to perform the averaging operation.

Averaging unit 10 can comprise, for example, the components shown in the block diagram in FIG. 3. Each output from latches 11a through 11d, which are connected in four stages that sequentially output data synchronized by a shift clock, is input into adder 12a. Each pixel in each line of the image data is input, in sequential order, into latch 11a. Each pixel is represented as multivalued data which express its density (or gradation of brightness). Thus in each of latches 11a through 11d, a specified number of bits is set which correspond to these multivalued data.

The first adder, 12a, adds the four values which represent the densities of the pixels stored in latches 11a through 11d, which are the last four pixels to have been input, i.e., the last four pixels on the path which is being scanned, and transmits the result to the second adder, 12b, through one of its input terminals. The sum of the densities of specified pixels in the last three lines, which were stored in line memory 13 (FIG. 2) is input into the other input terminal of adder 12b via AND circuit 14. The result of the addition performed by adder 12b is sent to both the line memory 13 and to divider 15.

The output of adder 12b is written into line memory 13 each time four pixels have been added, in response to a control signal which is not pictured in the diagram. In other words, the first through fourth pixels on the line being processed are input simultaneously into adder 12a. Based on the result of the addition performed by adder 12a, further addition is performed by adder 12b, after which the first write-in of data into line memory 13 is performed. When the fifth through eighth pixels have been added, the result is input into memory 13 in the second write-in. This procedure is performed repeatedly. In this way, the result of the addition of every four pixels on line 1 is stored in order in line memory 13.

When line 2 is processed, the result of adding every four pixels is obtained from latches 11a through 11d and adder 12a just as with line 1. At the same time, however, previous results of addition which were stored in line memory 13 are read out, and adder 12b adds the results obtained by adding every four pixels on line 2 to the corresponding results for every four pixels on line 1. In this way the densities of eight pixels, four of which are contiguous to the other four in each of two rows, are added together. The result of this addition is stored in line memory 13.

When line 3 (or line 4) is processed, the totals of the densities of certain pixels in lines 1 and 2 (or lines 1 through 3), which were obtained by the addition performed during the processing of the previous lines and stored in line memory 13, are added to the corresponding densities in the current line. When line 4 is processed, the result of the addition performed by adder 12b, i.e., the total of the densities of 4×4, or 16, pixels, is sent to divider 15, where it is divided by 16 to obtain an average value. The control signal which is input into AND circuit 15 goes to zero once line 4 has been processed. Readout of data from line memory 13 is prohibited, the cumulated value is reset, and the data stored in line memory 13 are cleared.

It is contemplated that by increasing or decreasing the number of latches, it is possible to increase or decrease the number of pixels whose density is averaged. Increasing the number of latches will produce an image with lower resolution. By varying the number of latches and choosing an appropriate timing for the input of the control signal to AND element 14, we can obtain an average density for N×M pixels. Which conditions are appropriate will depend on the image to be matched (or detected).

The average density of each sixteen pixels is used to construct an image consisting of new, larger, pixel units. The data concerning this new image are sent to binary processor 16, where at a certain threshold density they are converted to binary values. The resulting binary image is stored temporarily in multiple-line memory 17. This generated image is more blurry than the original image. Details of the original patterns in the image have been lost, and only rough shapes can be discerned. By setting an appropriate threshold for the conversion to binary, we can produce an image in which the interior of a given pattern, such as the corner or one of the markings on a bank note (or the side of the bill), will appear totally black while the background is totally white. Even if a misregister or other printing error in the original image as read out and input results in a slight discrepancy between the specified pattern which is stored and the pattern which is being checked, the discrepancy will vanish when the image is gradated. This scheme allows the image to be detected simply and quickly.

The output from the binary processor 16 is sent to search unit 18, where the gradated image with low resolution (actually, the binary data) is searched for a pattern of a given shape. That is to say, a search is made for a specified pattern in a region of a given size, such as a mask with dimensions N×N. This search will be explained below.

Figure 2:
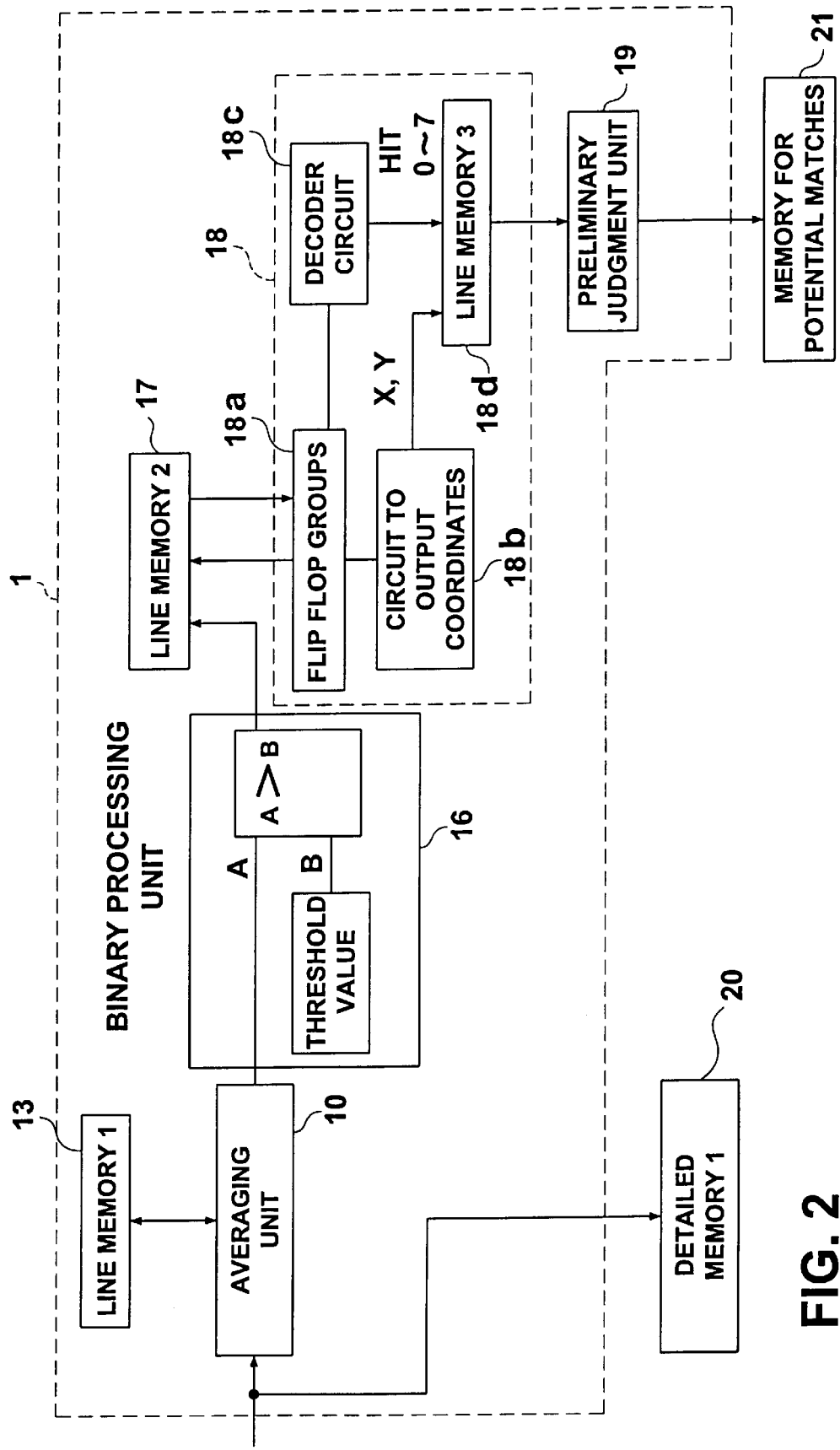
FIG. 2 is a block diagram of the internal structure of the device to detect a specified pattern (the detection device)

Search unit 18, shown in FIG. 2, comprises flip-flop group 18*a*; circuit 18*b*, which receives the output from flip-flop group 18*a*, obtains the point coordinates of the hits which indicate the positions of patterns representing possible matches, and outputs those coordinates; decoder circuit 18*c*, which specifies the orientations and other features of the patterns; and line memory 18*d*, in which are stored the data representing detected patterns which are possible matches.

Figure 4:
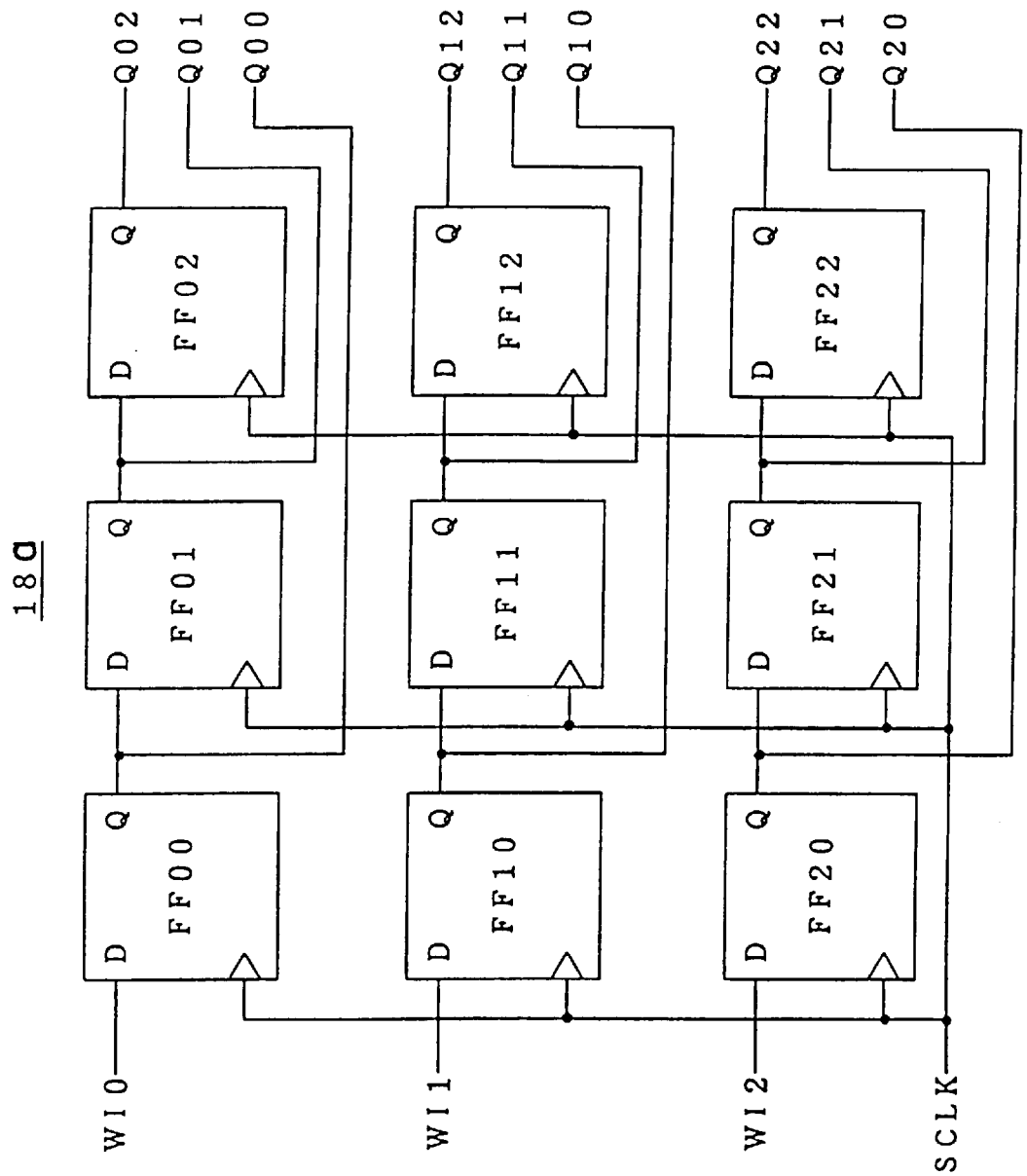
FIG. 4 is a block diagram of the internal structure of the flip-flop groups in the detection device.

An example arrangement of flip-flop group 18*a* is shown in FIG. 4. In this example, the area being processed consists of 3 pixels of scanning×3 pixels of feed, or 9 (3×3) flip-flops FF. The three pixels W10, W11 and W12, which are in line in the feed orientation, are taken from the image data stored in line memory 17, synchronized by means of the shift clock SCLK, and input to the first column of flip-flops, F00, F10 and F20. New pixel data are input to W10, W11 and W12 sequentially according to timing provided by the shift clock, and the data are transmitted to the next column of flip-flops. The pixel data which were input for the binary image, Q00, Q01, Q02, Q10, Q11, Q12, Q20, Q21 and Q22, are output through the output terminal Q on each flip-flop. For a black pixel, the output of the flip-flop will be "1".

When all scanning data up to the end of one line have been input, the device shifts down one line in the direction of feed and inputs data from the beginning of that line. Thus scanning the 3×3 pixel area (the mask) which is the domain of the search is equivalent to moving over the surface of the document.

Figure 5:
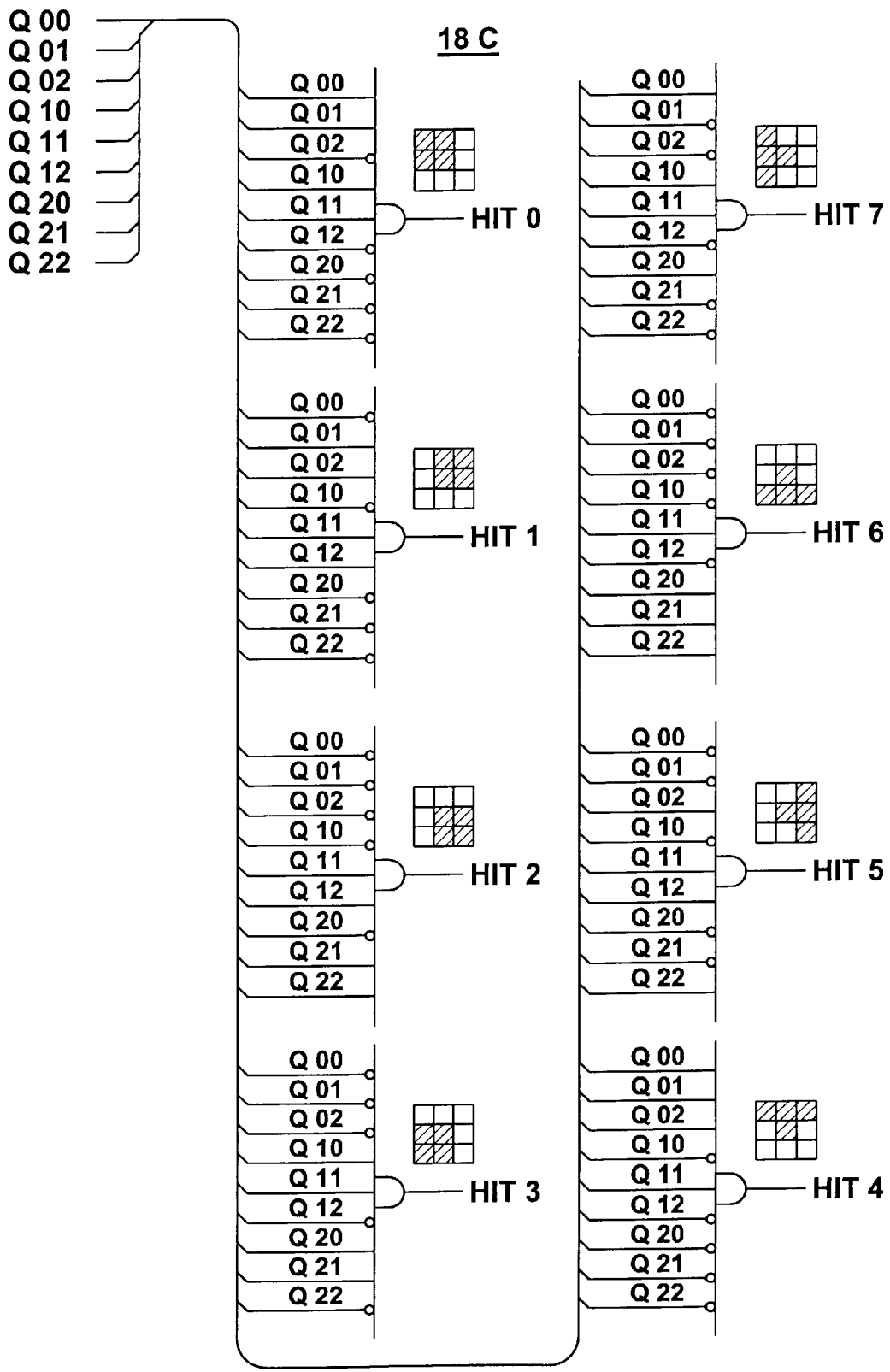
FIG. 5 is a block diagram of the internal structure of the decoder circuit in the detection device.

Each of the outputs, Q00, Q01, Q02, Q10, Q11, Q12, Q20, Q21 and Q22, is input into decoder circuit 18*c*. An example of decoder circuit 18*c* is pictured in FIG. 5. If the pattern of 3×3 pixels which is output by flip-flop group 18*a* is one of the eight patterns (Hit 0 to Hit 7), the output of the corresponding AND element will go high. If the output from decoder circuit 18*c* for Hit 0 goes high, we know that there is a dark area in the top left-hand corner of the grid, centered around flip-flop FF11. If the output for Hit 4 goes high, we know that there is a dark area covering the upper part of the grid, centered around flip-flop FF11. In this example, the object of the search is a corner. Therefore, patterns other than these eight, such as when the central pixel is in the middle of a border or within or outside a dark area, will not be detected.

Circuit 18*b* is connected to the addresses in multiple line memory 17. It outputs to flip-flop group 18*a* the addresses of images which must be input, and it outputs to line memory 18*d* the coordinates (XY) of the pixels output by FF11 (FIG. 4), the central flip-flop in group 18*a*. The output of decoder circuit 18*c* and the central coordinates XY at that moment are stored in line memory 18*d*. The detection results for several lines worth of data are also stored in line memory 18*d*. In this example, nine flip-flops representing 3×3 pixels were used to detect the corner of a figure and the states of the decoder circuit 18*c* were those shown in the diagram. However, the number of flip-flops used and the conditions for the decoder circuit 18*c* are preferably selected according to the shape of the pattern one wishes to detect and which portion of it one chooses to focus on. It would, of course, be possible to detect a circle or some other shape as required.

In the embodiment described above, the search for the specified pattern to be detected was carried out by hardware. It would also be possible to handle this processing via software, as will be discussed below. We shall next explain how a search is made for a corner, as in the embodiment discussed above, and how a search is made for a circle (or a mark).

Figure 6:
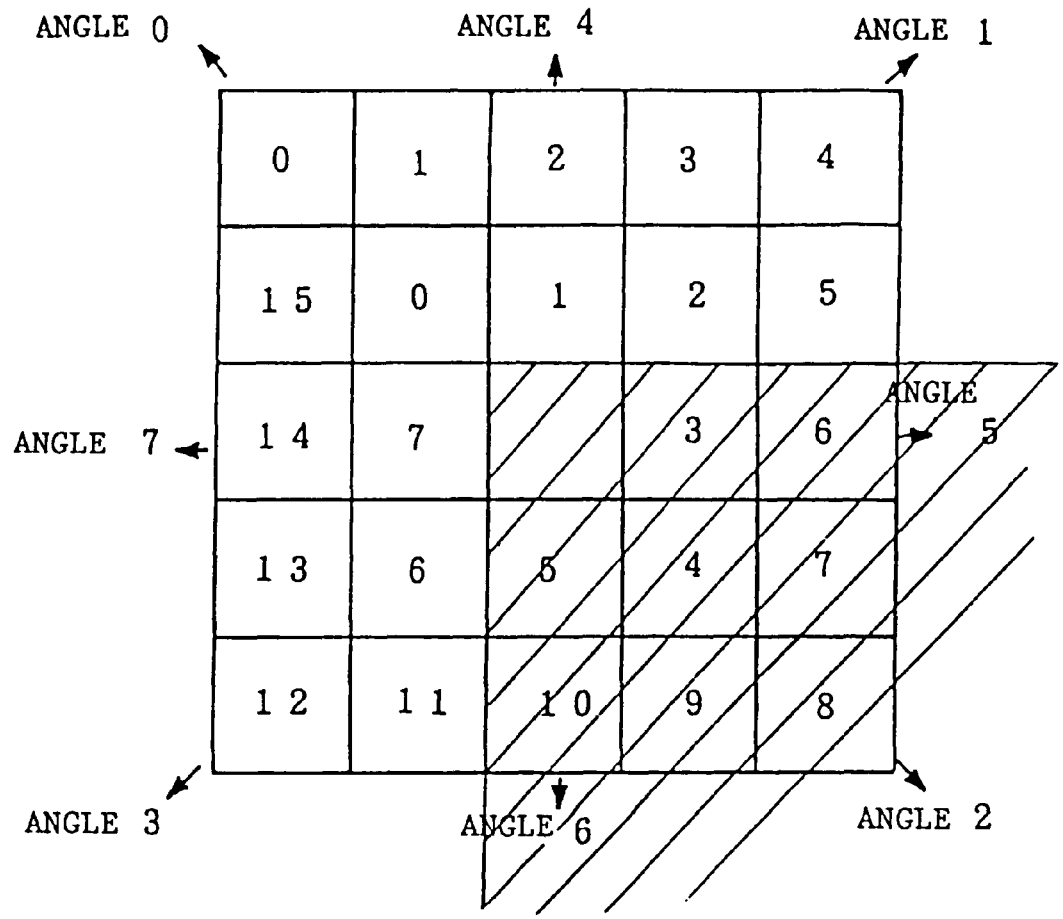
FIG. 6 is a diagram of the mask used by the search unit which looks for corners.

As shown in FIG. 6, a 5×5 pixel mask is used, in which the object of the search is the central pixel. The first step is to number the pixels of the exterior and interior peripheries. For convenience, we begin with the leftmost pixel in the top row, which is assigned the address "0". The pixels in the exterior periphery are then numbered in ascending order, moving clockwise, and the pixels of the interior periphery are numbered in the same way, beginning with the leftmost pixel in the highest row of interior pixels. Thus, an address i between 0 and 7 is assigned to each interior peripheral pixel, and an address i between 0 and 15 to each exterior peripheral pixel. If an address for a pixel falls outside of this range (0 to 7 for the interior periphery and 0 to 15 for the exterior periphery) in each processing operation, the proper address can be obtained by adding or subtracting 8 or 16, respectively. If, for example, i=16 for an address on the exterior periphery, the actual address will be 0. If i=−1, the actual address will be 15.

The four corners of the mask are numbered starting from the upper left corner, which is called angle 0, in ascending order moving clockwise. The midpoints of the sides of the mask are numbered starting from the top, which is called angle 4, and moving clockwise, so that the other midpoints are labeled angles 5, 6 and 7. After the mask is numbered in this way, the relevant pixel data in it are searched following the processing steps enumerated below to determine whether or not the specified pattern to be detected can be found.

First, the mask is scanned with reference to the low-resolution gradated image data which were received. If there is a black pixel in the center, we proceed to the next step, which is the search for a starting point. In this example, it has been established that this portion of the specified pattern (the object of the search) is black, i.e., a black pixel. However, with the opposite pattern, black and white would be inverted, and the central pixel would be white. The subsequent procedure would be the same.)

A search is made of the periphery of the mask for the point where the black pixels commence, i.e., the point where the area changes from white to black pixels. In other words, the system resets at i=0 and searches, incrementing each time by one, for a point where pixel number i is black and pixel number (i−1) is white. If a starting point is not found when i=16, the judgment is made that the pattern in this mask is not a possible candidate for a match, and the rough search is completed. If a starting point is found, we proceed to the next step, which is searching for an endpoint. In the example which is pictured, when we increment i until we reach i=6, we find a black pixel (shown by hatching in the drawing). Since the previous pixel, pixel 5 (i−1), is white, we conclude that i=6 is the starting point of the black pixels.

We now search for the point on the periphery of the mask where the black pixels end, i.e., the point where black pixels go to white pixels. Since in this example we are searching for a corner which is a right angle, we can predict where the endpoint ought to be with respect to the starting point if this is indeed the specified pattern. We jump to that point and judge whether or not it is a point at which black pixels end and white pixels commence. If it is not, then a judgment is made that the starting point detected in the previous processing is not the edge (or corner) of the specified pattern.

Accordingly, a judgment is made as to whether each of the following three conditions (1)–(3) below is met. If a condition is met, the system moves to the next step of angle detection processing. If any of the three conditions is not met, it is concluded, as described above, that the starting point which was detected is incorrect. The value i is augmented by 2, and we return to the second step of the starting point detection processing, in which we repeat the process of detecting the starting point for another location. If the corner does not form a right angle, the numerical value is changed in an appropriate fashion by adding the values given below to the value i, according to the angle.

(1) If i is 3, 7, 11 or 15, i+6 is a black pixel, and i+7 is a white pixel, then i+6 is the endpoint.

(2) If i+5 is a black and i+6 a white pixel, then i+5 is the endpoint.

(3) If i+4 is a black and i+5 a white pixel, then i+4 is the endpoint.

In order to determine the orientation of a pattern which is a candidate for a match, we must determine which of the aforementioned angles 0 through 7 it faces. To do this we cover the area between the peripheral starting point and endpoint with black pixels, and cover the area between the endpoint+1 and the starting point−1 with white pixels. If one of angles 0 through 7 is among the black pixels (in this case, one of angles 0 through 3), we say that the pattern is facing that angle. The number of that angle is used to indicate the orientation of the pattern. Is several angles are found in the black pixels, the pattern is oriented toward one of the four greater angles (angles 4 through 7). In actual practice, the angle can be obtained by performing the following calculations.

$$K_1 = (starting\ point + 3)/4$$

$$K_2 = (endpoint)/4$$

For both $K_1$ and $K_2$, we discard fractional values. If $K_1$ is 4 or more, then $K_1 = K_1 - 4$. If when we compare $K_1$ and $K_2$ we find that they are equal, then the value of $K_1$ is used as the number of the angle the pattern faces (one of angles 0 through 3). If $K_1$ and $K_2$ are different, we add 4 to $K_1$ to obtain the numerical value of the angle the pattern faces (one of angles 4 through 7).

Figure 7:
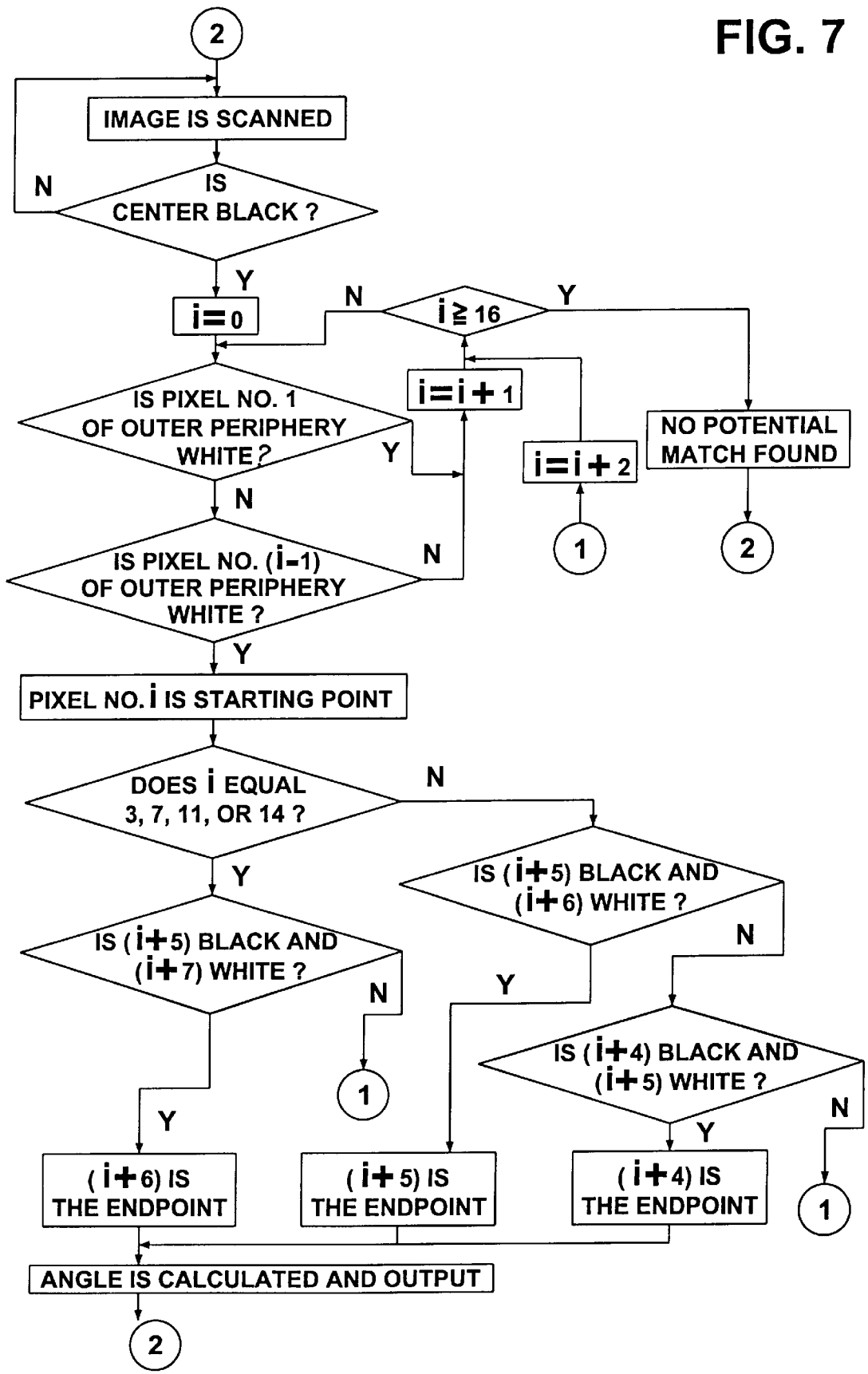
FIG. 7 is a flow chart illustrating the workings of the search unit which looks for corners.

When a pattern is detected by the processing described above which looks like the specified corner, the coordinates of its hit point, i.e., the reference position for that corner (for the apex of a corner, the central position of the mask), are sent to preliminary judgment unit 19 along with the orientation of the angle. The flow of operations performed during a corner search is pictured in FIG. 7. The corner which was searched for in this example need not be limited to the outer corner of a bank note. Any type of corner can be searched for, including a corner-like pattern on the interior portion of a bill or in any other document.

A rough search is made by detecting a round pattern of a specified diameter in a specified area. More specifically, a standard ring of a specified diameter is used, as shown in FIG. 8 (the D us ndicates the center of the ring). A pattern which is found is matched against these rings; if it has a high degree of coincidence, it is judged to be a possible match.

Line memory 18*d* in search unit 18, which is realized in hardware, stores a great many data which will not need to be sent to pattern extraction device 2 for the next step of processing. The data which are stored in line memory 18*d* are sent instead to preliminary judgment unit 19, where a judgment is rendered as to whether those data should be sent to and processed by pattern extraction device 2 (preselection of hit points).

In this example, a rough search is performed with reference to gradated data. This allows image data which potentially have the specified pattern to be identified swiftly and surely as possible matches. At the same time, a large quantity of useless data are also detected. When the states of the pixels on the periphery lead to the judgment that a given pattern is not the specified pattern, that pattern can be eliminated without being output to pattern extraction device 2, obviating the need for subsequent more detailed judgments. Only the actual hit points are output to memory 21 in pattern extraction device 2.

To process this judgment, data stored in memory 18*d* for which the output goes high (the hit points) are extracted, and effective hit points are detected based on the relative spatial relationships among these hit points and other hit points which are on their periphery. The position coordinates XY and the orientation data for these points, HIT 0 to 7, are stored in memory 21.

To give one example, depending on the type of pattern being sought (its shape, size, etc.), if there is another hit point in the vicinity of a hit point which has seen detected, or within a specified area around that hit point, then the first hit point will be regarded as valid. If a number of hit points are found within a specified area, then an appropriate decision will be made, depending on the pattern, to consider only the periphery (FIG. 9 (A)) or only the center (FIG. 9 (B)).

In the example discussed above, when a specified number of pixels from the image data were averaged to create a gradated image, the resolution was altered to a specified level in a single operation. It would alternatively be possible to alter the resolution gradually using a series of operations.

Figure 10:
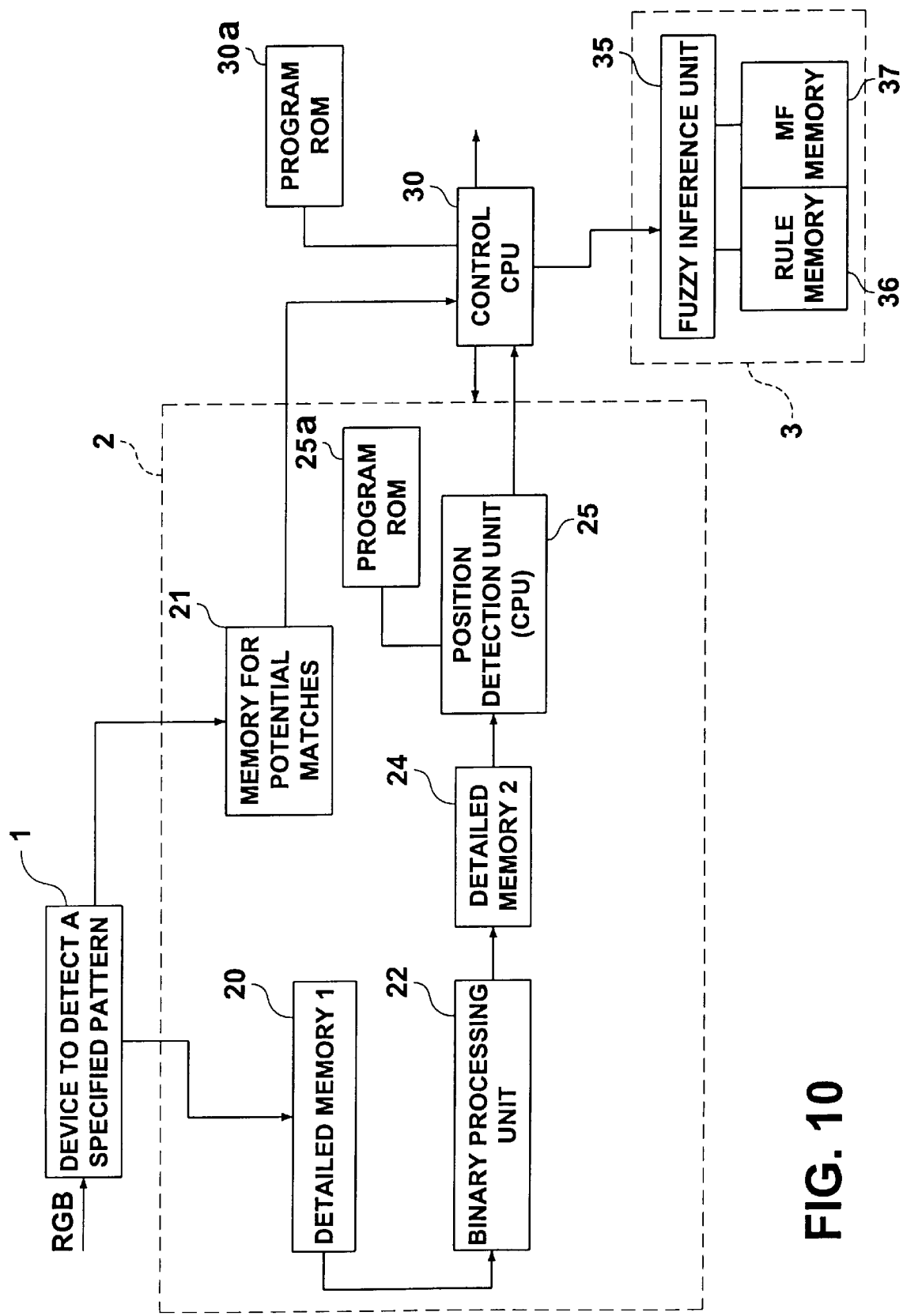
FIG. 10 is a block diagram of the internal structure of the device to extract a specified pattern and the device to match it against a reference pattern.

FIG. 10 is a block diagram illustrating an exemplary configuration of pattern extraction device 2. As shown in the FIG. 10, device 2 continuously stores in memory 20 the RGB data (the variable density image) from detection device 1 which have not yet been converted to binary values. Memory 20 has a sufficient capacity to allow it to maintain storage of image data from the pixels (or the line) currently read by the image sensor to a specified earlier point (at least as large as the pattern to be detected). If its capacity is reached, the oldest data (the data acquired earliest) are erased and new data are written in their place.

As was described earlier, the coordinate values and orientation of valid hit points output by preliminary judgment unit 19 in detection device 1 (FIG. 2) are written into memory 21. The stored coordinate values are read out by control CPU 30. The CPU 30 sends various control signals to extraction device 2, thus controlling its operation. One such control signal is the command sent to memory 20 telling it to output, based on the coordinate values read out from memory 21, the image data which contain the pattern associated with a valid hit point.

Based on the coordinates read out by CPU 30, the corresponding image data stored in memory 20 are sent to binary unit 22. Here the RGB image data are converted to binary values; however, the threshold value for this conversion need not be the same as that used by binary processor 16 in the pattern detection device 1 (FIG. 2). Since the primary objective in device 1 was to detect the presence of possible matches to the specified pattern, the threshold was set at a level which basically rendered the interior of the pattern entirely dark. The threshold used by device 2 is set so as to extract more accurate hit points (specified positions) and exhibit a detailed mosaic which reveals the characteristics of the detected pattern so that pattern recognition can be performed at a later stage.

The binary data produced in this fashion are stored temporarily in detailed memory 24 and sent in order to position detection unit (CPU) 25. Here reference points are obtained for the matching operation to be performed in matching device 3. Based on data stored in program ROM 25a, which is connected to CPU 25, a certain specified position in the specified pattern to be detected is obtained. For a corner, this position is the accurate location of the apex, and for a mark, the accurate location of the center.

Figure 11:
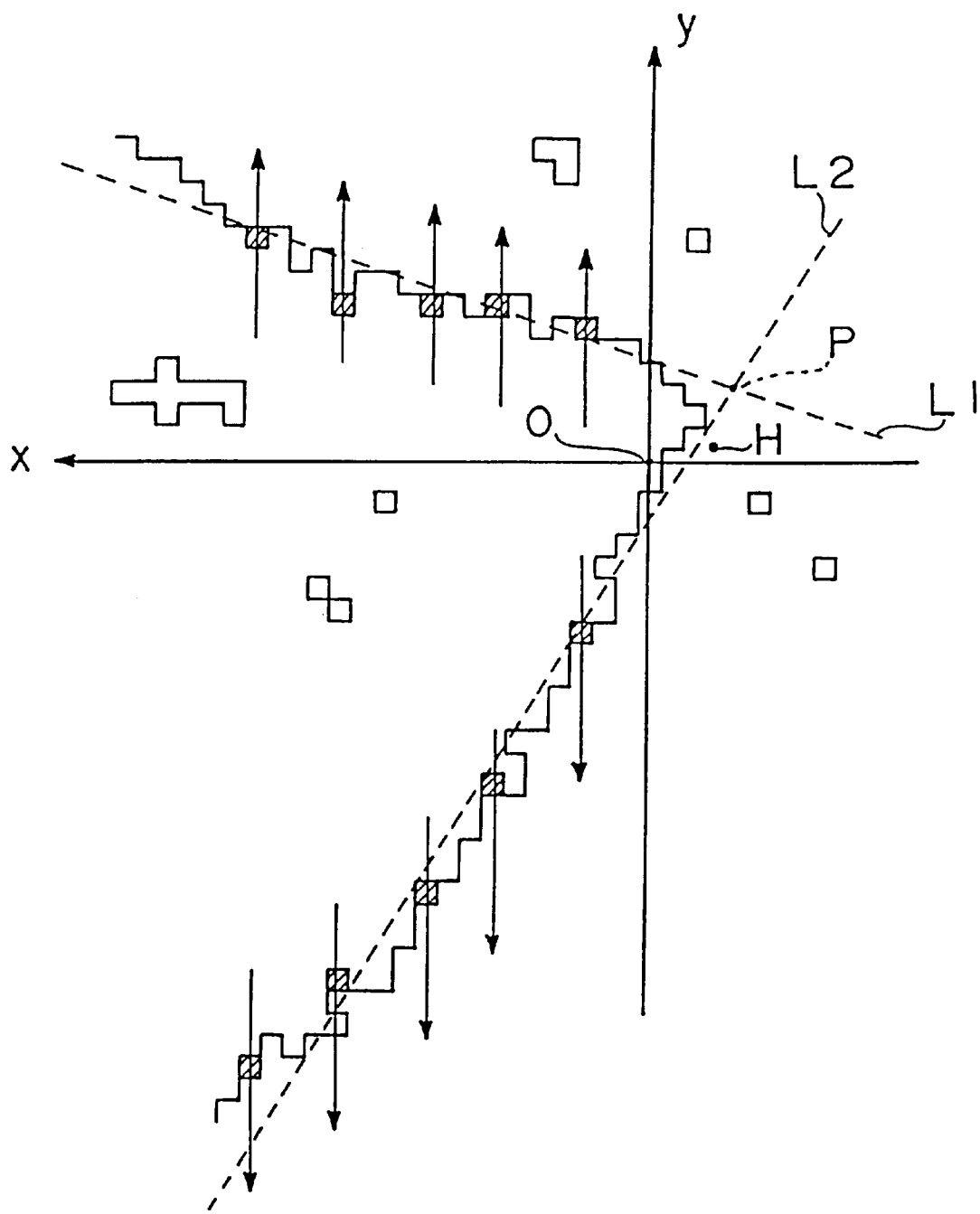
FIG. 11 is a diagram illustrating how corner detection works in the position detection unit.
Figure 12:
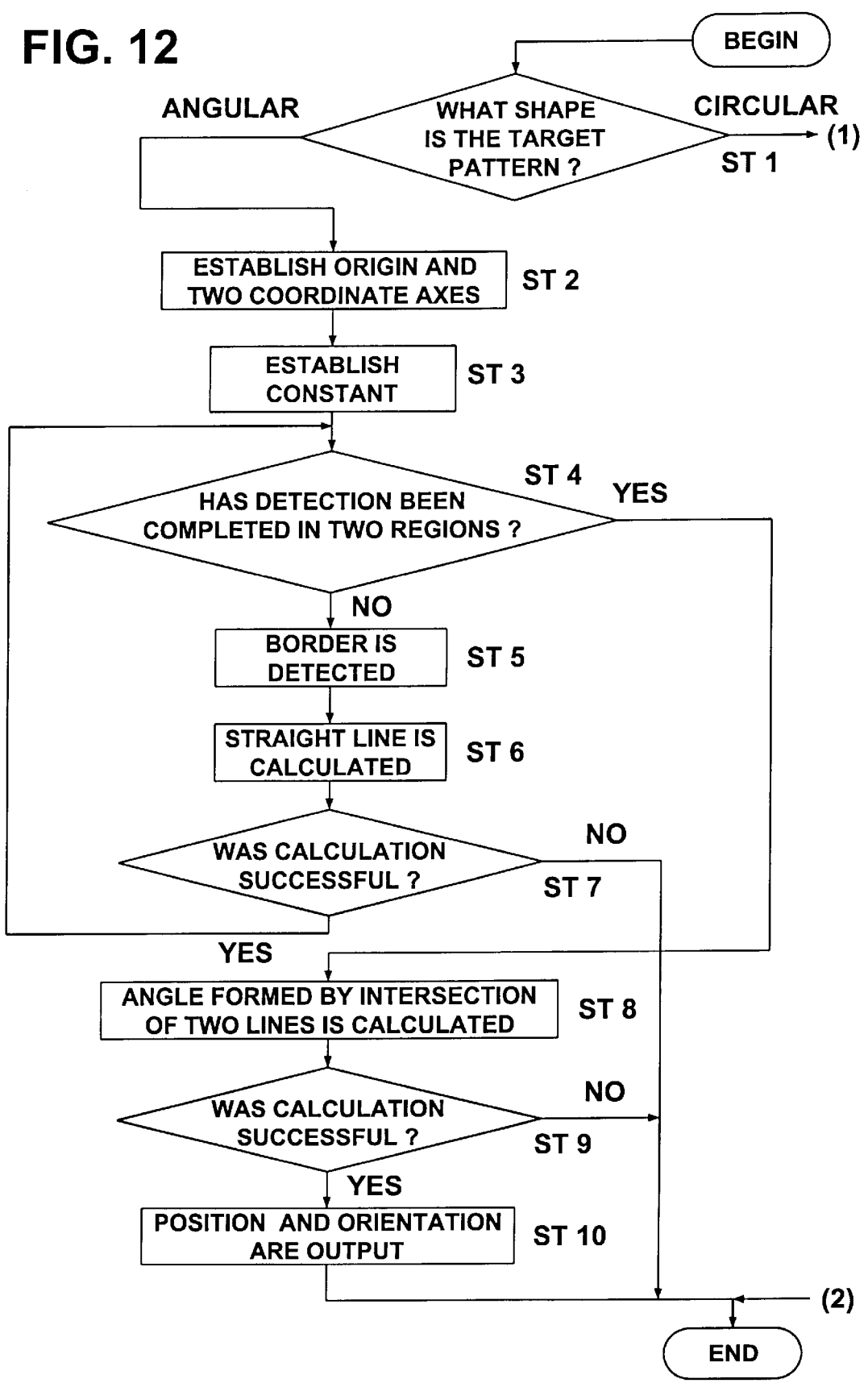
FIG. 12 is a flow chart illustrating the function of corner detection in the position detection unit.

In other words, position detection unit (CPU) 25 operates in fundamentally the same way as preliminary judgment unit 19, which was described above. It performs the processing which is appropriate for a pattern which is a corner or a mark, and it obtains a specified position within that pattern, which is the accurate location of the apex for a corner and the accurate location of the center for a mark. If when position detection unit (CPU) 25 extracts this accurate position it judges that this candidate is not the specified pattern to be detected, output will cease as explained in more detail below with respect to FIGS. 11 and 12.

In the rough search, the approximate apex of the corner (the hit point) is known, as well as the orientation of the corner. A hypothetical origin 0 is established in a specified position in the vicinity of hit point H and inside the corner. From this hypothetical origin 0, a horizontal X axis and a vertical Y axis are established (Steps 1 and 2).

Next, the necessary constant is established for detection of a specified position in the pattern (Step 3). Moving along the X axis in steps of a specified width (indicated by arrows in FIG. 11), we scan at each step in a positive (upward) and negative (downward) direction parallel to the Y axis, judging whether the pixels are black or white. We find the border between black and white (the border where black ends and white begins will be called an edge hereafter) (Steps 4 and 5), and we draw a straight line following the edge which has been detected as closely as possible (segments indicated by hatching). The minimum mean square criterion, for example, might be used to cause the various edges which have been detected to approximate a straight line (Steps 6 and 7). When the relevant processing is performed, the two edges which extend on both sides of the Y axis are regularized as straight lines L1 and L2. The intersection of these two lines is found and labeled apex P (Steps 8 and 9).

The precise orientation of the corner can be computed from the slope of one of the straight lines (or edges) which have been detected or from the slope of the line bisecting the angle formed by the two straight lines (Step 10). The coordinates of the apex and the slope are transmitted to control CPU 30.

If when the apex is extracted two edges cannot be found, or if an insufficient number of edge data are found, or if the angle formed by the two edge lines varies substantially from the specified angle, then a judgment will be rendered that the pattern found is not the corner we are seeking, i.e., it is not the specified pattern to be detected, and output will cease.

Figure 13:
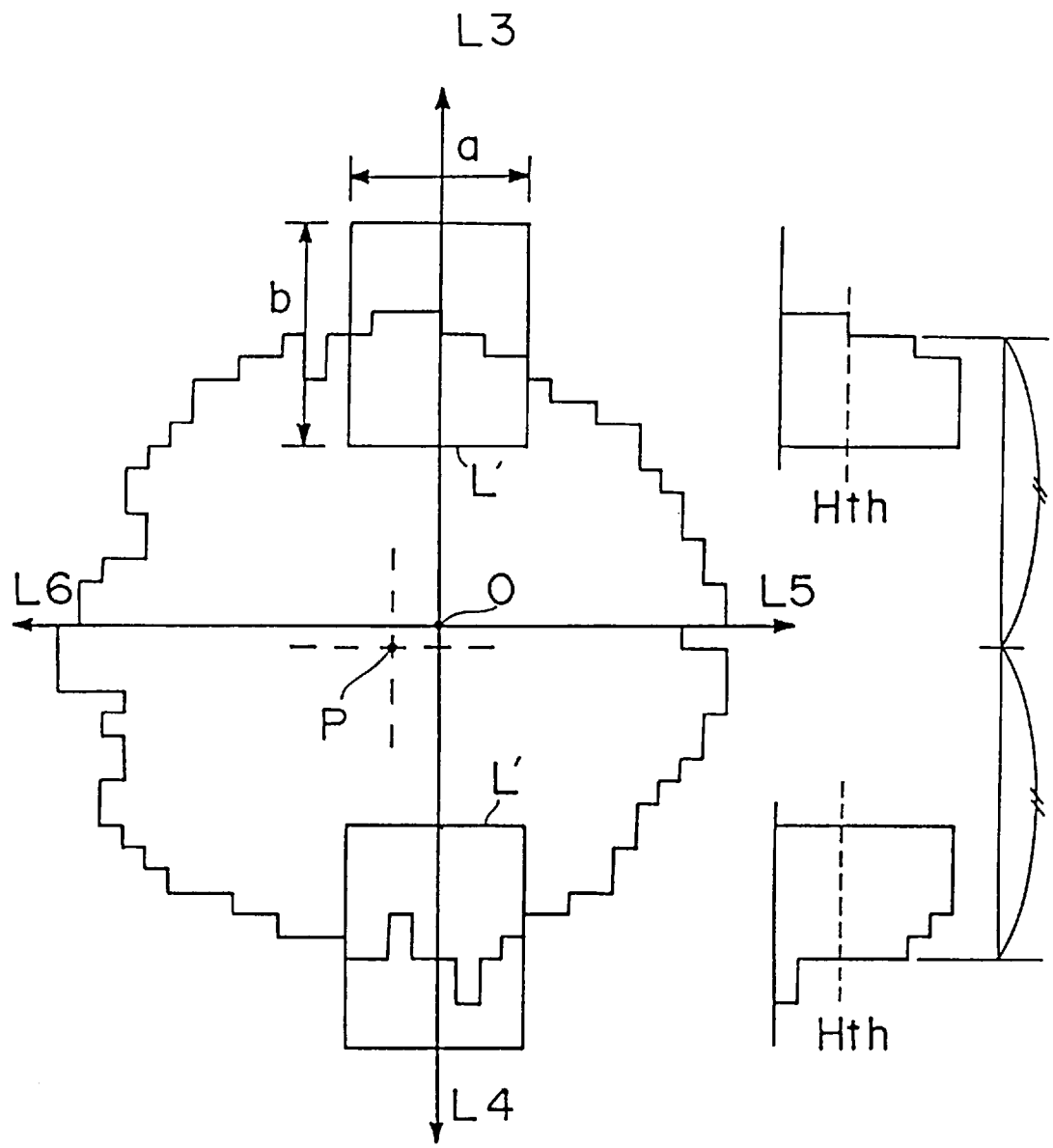
FIG. 13 is a diagram showing how mark detection works in the position detection unit.

As is illustrated in FIGS. 13 and 14, the hit point discovered in the rough search for a mark is considered to be the hypothetical center point 0. Lines L3 through L6 are drawn in the four compass directions from center point o to form X and Y axes (Step 11). The necessary constants are established for the detection of specified positions in the pattern (Step 12). Since the radius of the mark is already known, the approximate location of its circumference, i.e., its edge, can be determined. A line L' is drawn orthogonal to the radius, and this line is used to establish a window, i.e., an area, with a width a and a depth b (Steps 12 to 14).

A histogram is drawn of the black pixels in the direction of the search (the radial direction) and the orthogonal direction. A certain height of the histogram Hth is chosen to be the threshold value. Levels greater than height Hth are considered to represent the mark as far as they continue. The point where they end is considered to be the start of the blank area. The border between these areas is considered to be the edge. Rather than making a judgment based solely on processing involving a threshold value, it would alternatively be possible to extract the border between the pattern and non-pattern portions based on the variation in the height of the histogram and its continuity (Steps 15 and 16).

The search for the edge is performed in a radial direction on both the left and right sides, and a center position P is obtained for the edges which have been extracted as a result of the search. In the same way, the upper and lower edges are found, and center positions are obtained for them (Steps 17 and 18).

When only one edge can be extracted, the radius of the target image can be used to determine the center. This is done by moving back from the edge which has been detected along a radius a distance equal to the radius of the target and declaring that point to be the center. When the center position and the radius have been determined in this way, the relevant data are output to CPU 30 (Step 19). If a center cannot be found when a number of hypothetical center points have been detected as described above (because the diameters vary too much or edges cannot be detected on both sides of the diameter), a judgment will be rendered that the image data being processed do not contain the specified pattern to be detected, and output will cease.

Since in this example only the data within the window are searched, the processing can be done at a high speed. If there is a specific shape within the specified pattern or a characteristic of some kind inside the mark, the data can be expressed as a four-directional histogram in the same way as was described above. Since the angle of rotation is known, it, too, can be transmitted to CPU 30 as needed.

Figure 15:
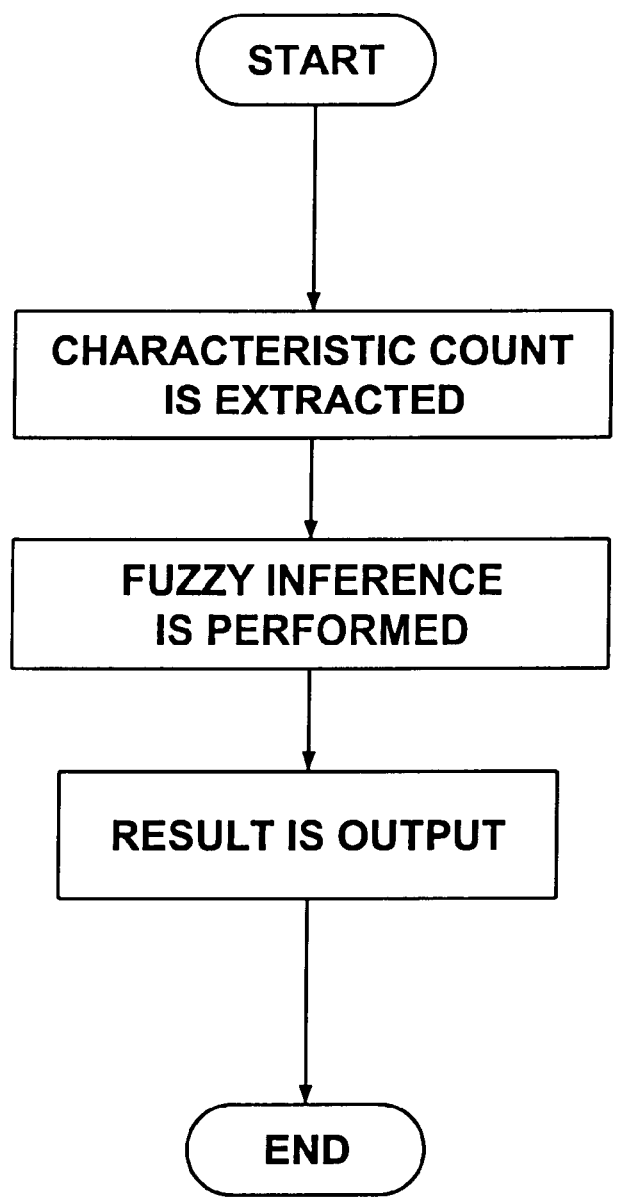
FIG. 15 is a flow chart illustrating how the device to match a specified pattern against a reference pattern works.

We shall next discuss the workings of pattern matching device 3. As is shown in FIG. 10, the coordinate data for the apex and slope of a corner resembling the specified pattern or for the center position of a mark are sent from position detection unit (CPU) 25 to control CPU 30. Based on the data stored in program ROM 30a, control CPU 30 specifies which of the image data stored in memory 24 must be read out, and it decides which area of the image data should be matched against the specified pattern to be detected. The relevant image data in this region are transmitted from memory 24 to fuzzy inference unit 35 based on a control signal from control CPU 30. Inferences are processed using the fuzzy knowledge stored in memories 36 and 37, which include rules and membership functions. A judgment is then rendered as to the degree of resemblance between the received image data and the previously established specified pattern to be detected (See FIG. 15).

An example is shown in FIGS. 16(A)–16(B). Characteristic spaces are set up using pre-gradated image data. The number of characteristics is extracted by counting the actual number of set pixels in each characteristic space (each of the four regions shown in the example). In this way we find that characteristic space R1 has 24 pixels, space R2 has 26, space R3 has 30, and space R4 has 29.

Using the characteristic counts which have been extracted, fuzzy inferences are performed according to previously established rules and membership functions (shown in FIG. 17), and the degree of fit (i.e., the degree of resemblance) between these data and the reference pattern is determined and output. In the example shown, the degree of fit is 0.6. Since this is higher than 0.5; which is the judging standard, it is concluded that this image is identical to the reference pattern.

In this example, the characteristic spaces are produced by drawing a lattice; however, the user may choose some other form of characteristic space which better suits his purposes, such as concentric circles or rectangles. The characteristic count which is extracted may also take other forms than the number of pixels per space. One could alternatively use the number of connected or disconnected pixels, their orientation, or another characteristic.

In this example, too, when the fuzzy knowledge was laid down, a number of items of fuzzy knowledge were established pertaining to a single specified pattern to be detected. These various items of knowledge can all be invoked when inferences are processed. It might happen, for example, that the image data which were read are not identical to those of the specified pattern to be detected, but are spatially shifted by a certain amount due to a printing misregister or some other error. A frequent problem with marks is that the angle of rotation is unclear. To deal with such situations, we can hypothesize a misregister of the specified pattern to be detected or numerous possible angles of rotation when we are creating the fuzzy knowledge, and we can store these hypotheticals.

Figure 18A:
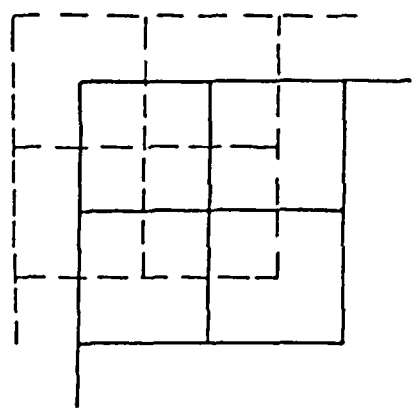
FIGS. 18(A)–18(B) are diagrams illustrating the automatic creation of fuzzy knowledge to be used by the matching device.

An example concerning a corner is given in FIG. 18(A). Map data are created by reading the target (or reference) pattern with a specified resolution, using an image whose central portion is correctly registered as shown by solid lines in the drawing. These map data are equivalent to the image data output by binary unit 24 in pattern extraction device 2 at the time the specified pattern to be detected is read by the copier. In the same way, map data are created for an image which has been shifted horizontally, to the upper left (shown by dotted lines in the drawing), to the upper right, to the lower left, or to the lower right.

Figure 18B:
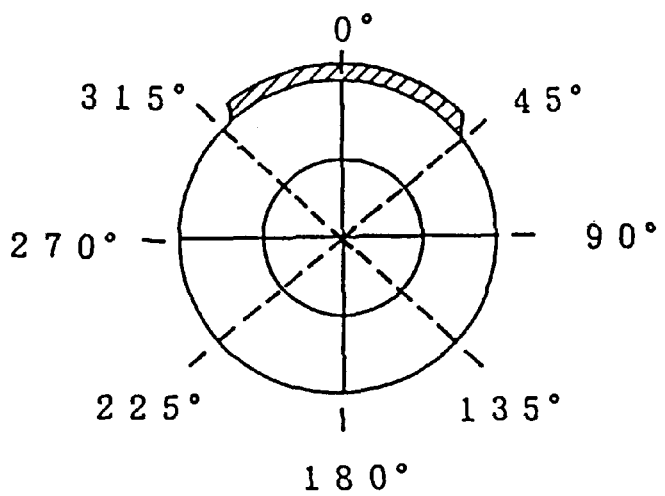

For a mark, as shown in FIG. 18(B), map data are created by reading the target (or reference) pattern with a specified resolution, using an image whose angle of rotation is 0° (an image which is vertically oriented). These map data are equivalent to the image data output by binary unit 24 in pattern extraction device 2 at the time the specified pattern to be detected is read by the copier. The polar coordinates of this image are changed so that their angles of rotation have been shifted in 45-degree increments, and map data are created for the resulting images. For each of these images, an item of fuzzy knowledge is created. In this way numerous items of fuzzy knowledge are created by altering the angle of rotation of a single pattern (in this case, a mark).

The numerous items of fuzzy knowledge achieved in this way are grouped into sets, all of which are used to draw inferences. The pattern with the highest inferred degree of fit is deemed to be the recognized specified pattern to be detected. This scheme allows us to extract likely matches and to process inferences concerning these putative matches without regard for the direction in which a mark is rotated or the shifted position of a corner.

It is also possible to create fuzzy knowledge without resorting to this type of grouping, by statistically processing every possible shifted image. In this case, there will ultimately be a single mass of fuzzy knowledge; however, when we create fuzzy knowledge by considering the direction of rotation or the horizontal shift of a single reference pattern, we are using the numerous items of knowledge mentioned in this invention. When we compare the two approaches, we find that the former, i.e., using sets of knowledge items, offers a higher rate of pattern recognition, while the latter offers a greater processing speed. The user must decide which choice is appropriate.

If the image is shifted by one pixel (or by an integer multiple of one pixel), an addressing operation can be performed. This consists of repeatedly performing an inference while shifting the reference pattern or the pattern one is trying to find to one side in a specified direction. This approach allows us access to the same operations and results as if we were using numerous items of knowledge, even though these items are not actually stored in the memory. It also allows an accurate judgment to be made even if the position of the pattern is shifted. The concept described herein of deriving numerous items of knowledge from a single pattern is broad enough to include both the actual storage of these items in a memory and the hypothetical use of these items described above.

The degree of fit inferred on the basis of numerous items of knowledge as described above is output to a PPC (a copier) by way of control CPU 30. When the degree of fit exceeds a given threshold value, the copier will conclude that the document presented is a bank note or some other item which cannot be legally copied. It will proceed to execute the program it has for prevention of forgery by, for example, prohibiting the copying operation, outputting a totally black screen, etc. As an alternative, CPU 30 can render a judgment as to whether the item presented is a prohibited document, i.e., whether it contains one of the specified patterns to be detected, and it can output the result, e.g., a stop signal, to the copier.

Figure 19:
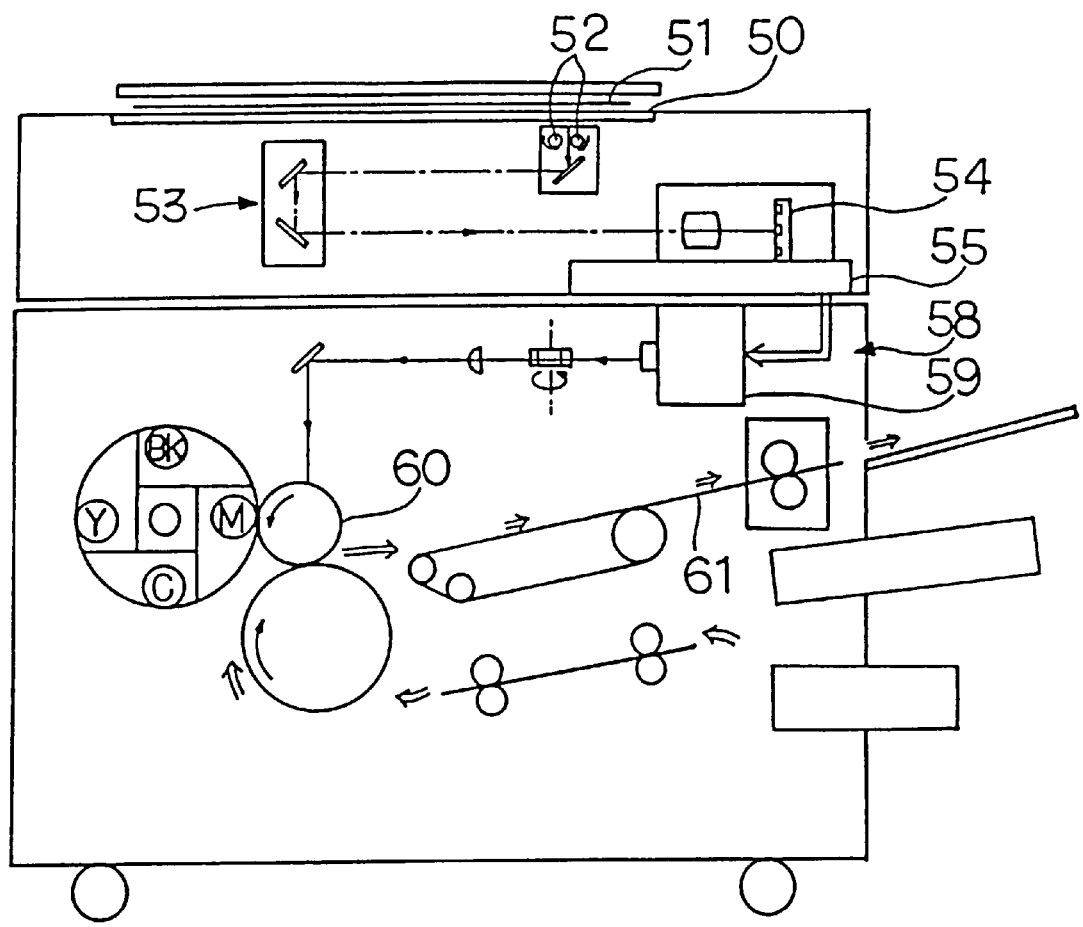
FIG. 19 is a side, cut-away view of an example of a copy machine in accordance with this invention.
Figure 20:
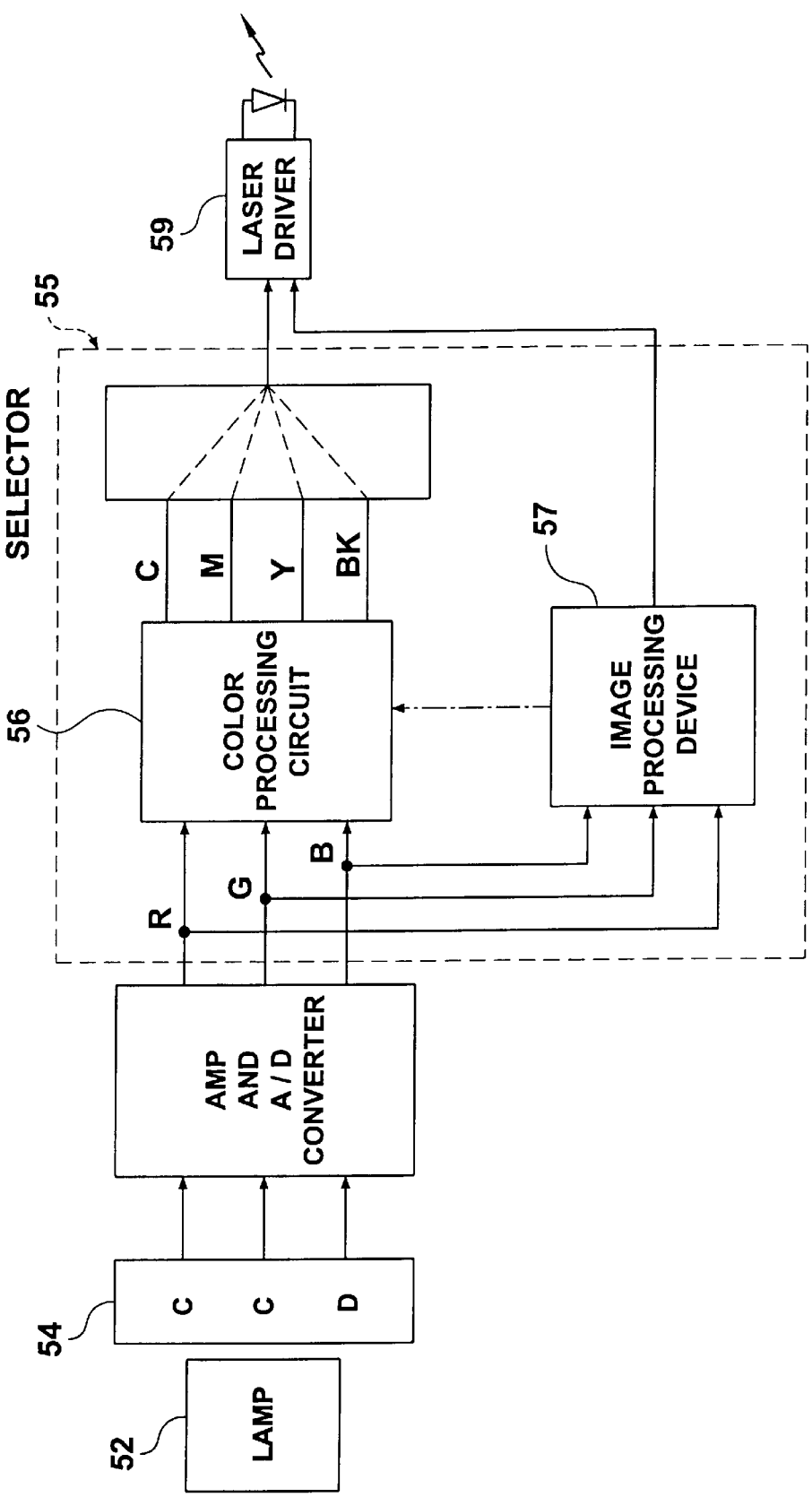
FIG. 20 is a block diagram of an example of a copy machine in accordance with this invention.

FIGS. 19 and 20 show an example in which the device is built into a copy machine. As shown in the FIG. 19, the light emitted by lamp 52 is reflected by document 51, which is loaded on glass 50. The reflected light passes through optical system 53 and enters CCD 54, which is an image scanner. Here the image on the document is read. Lamp 52, as well as the flat mirror and other components which comprise optical system 53, moves at a specified speed as it scans the document. Line by line, CCD 54 reads the specified portion of document 51, and it transmits the image data (R/G/B) to signal processing unit 55.

Signal processing unit 55, which is shown in more detail in FIG. 20, has an ordinary color processing circuit 56 and image processing device 57, which is the image processing device discussed above as a feature of this invention. The image data is transmitted in parallel to color processing circuit 56 and to image processing device 57. Color processing circuit 56 analyzes the colors into their various components, magenta (M), cyan (C), yellow (Y) and black (Bk), and outputs these data to printing device 58. The image is actually scanned four times. One of the four components (M, C, Y, or Bk) resulting from the first scan is output to laser driver 59, which is positioned on the input side of printing device 58. This causes a laser beam to be projected onto a specified location on light-sensitive drum 60. When the fourth scan has been completed, the copying operation is performed on the copy paper, and the finished copy 61 is output. Since the actual mechanism which executes the copying operation is identical to that of existing copiers, we shall omit an explanation of its action.

While the signal processing is being carried out by color processing circuit 56, image processing device 57 is performing its own processing in parallel to obtain the degree of resemblance between the pattern it finds in the image data it is reading and the specified (or reference) pattern. If document 51, which is still being read, is a bank note or other document which may not be copied, the image processing device 57 will generate a control signal to halt the output of the laser driver 59 or transmit a control signal to color processing circuit 56 to cause it to execute its various copy prevention routines for situations when copying is prohibited, such as making the entire finished copy 61 go black.

The judgment processing in this embodiment is performed in real time during the first scan. This device, then, can be used in copiers which employ a single-scan method. It can, needless to say, also be used in copiers which employ a multiple-scan method. With copiers of this type, CPU 30 sends a control signal to pattern detection device 1, which is pictured in FIG. 2. The detection process can be performed for a different specified pattern to be detected on each scan.

In the example discussed above, a number of specified patterns can be detected on a single scan. Between the completion of the first scan and the beginning of the second, a command can be transmitted from CPU 30 to detection device 1 which changes all the parameters of the processing units (the threshold value for binary data and so on). By rewriting these parameters, we make it possible to detect a different group of specified patterns. This configuration, then, allows us to prevent the forgery of an extremely large number of prohibited documents, such as money, which serve as the specified pattern to be detected. Since only a portion, and not the entire face, of a bill is detected and matched against a specified pattern, none of the requisite memories need have a large capacity. Though it can accurately prevent the forgery of a variety of documents, as discussed above, the device does not require an extraordinary overall memory capacity.

Figure 21:
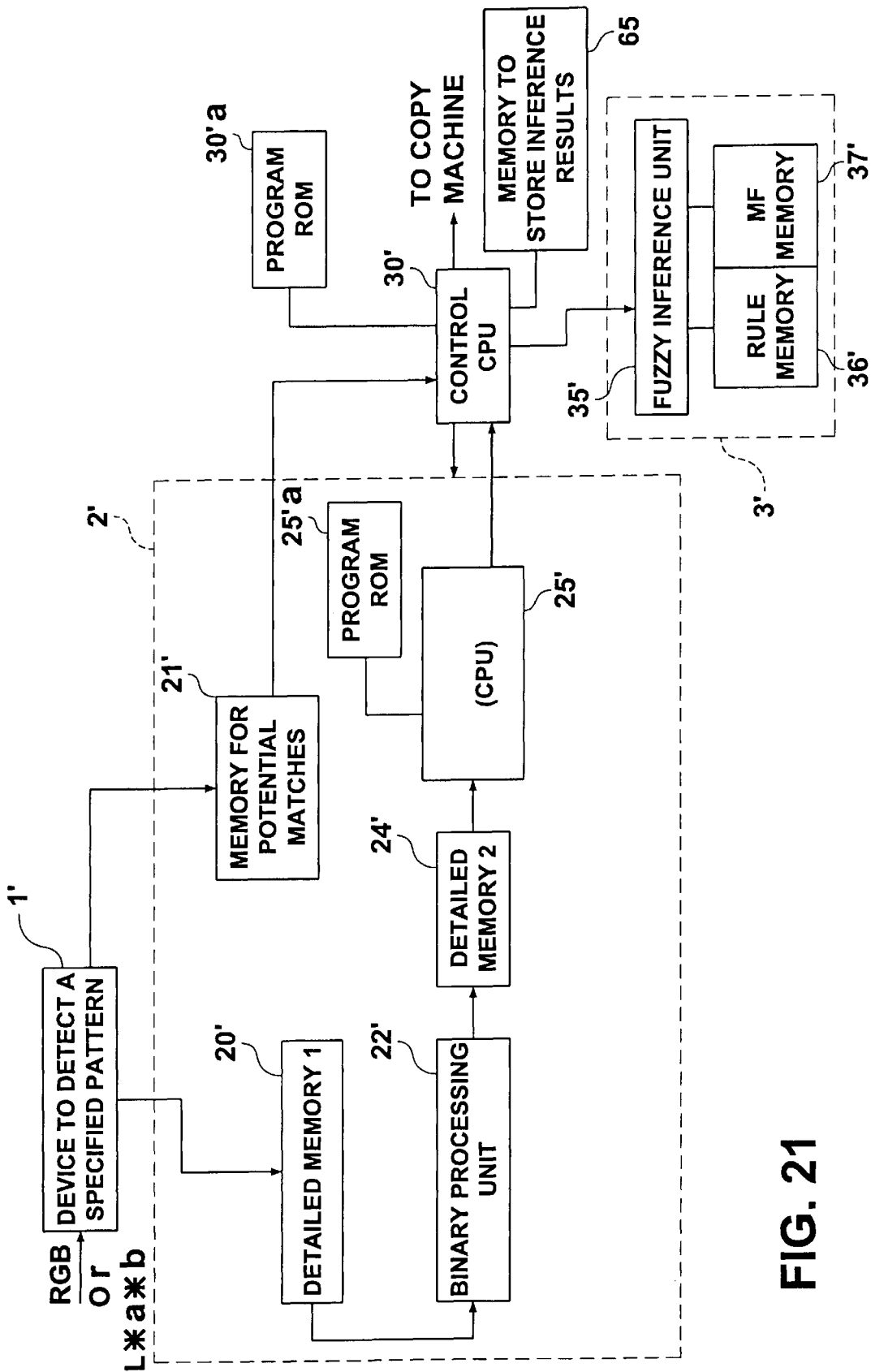
FIG. 21 is a block diagram of the internal structure of the device to extract a specified pattern and the device to match it against a reference pattern in another embodiment of the image processing device of this invention.

FIG. 21 shows a second embodiment of an image processing device designed according to this invention. In the first embodiment discussed previously, characteristics were extracted from the RGB data, which were transmitted pixel by pixel in a linear sequence, and the specified processing was then performed. In the second embodiment, which is suitable for copiers using a field-sequential scheme, all the R data, then all the G data, then all the B data of the image read for the printer are transmitted sequentially.

We shall next give a brief explanation of how the second embodiment works. As shown in FIG. 1, pattern detection device 1 conducts a rough search, pattern extraction device 2 conducts a detailed search, and pattern matching device 3 processes a judgment with respect to the potential matches for the specified pattern which have been extracted. This much of the basic structure is the same as in the first embodiment. The second embodiment differs from the first in that the second embodiment constructs separate reference patterns to be used in the matching process for each of the sets of R, G and B data. A rough search and a detailed search are performed after each of the signals RGB, which are transmitted in field-sequential fashion. In these searches, a characteristic count is extracted and potential matches are detected. Each time, an overall judgment is made as to the location of the characteristics, the degree of fit, and so on. A judgment is also made as to whether the image being processed is or is not identical to the specified pattern to be detected.

If we compare the hardware of the second embodiment, as shown in FIG. 21, with that of the first embodiment, which is pictured in FIG. 10, we see that the second embodiment has an additional memory 65 for the temporary storage of the results of inferences performed after each signal is received. This memory is connected to CPU 30'. Outside of the fact that the items they process are the total pixels of R, G or B data received in field-sequential fashion, pattern detection device 1' and pattern extraction device 2' have the same capabilities as their counterparts in the first embodiment.

CPU 30' transmits data concerning potential matches which it receives from pattern extraction device 2' to fuzzy inference unit 35'. Based on a reference pattern represented by signals which correspond to its features (which are stored in rule memory 36' and MF memory 37'), unit 35' performs fuzzy inference, and obtains the degree of fit of each potential match.

CPU 30' also judges whether each potential match should be considered an effective candidate (a candidate which should go into the pool to be judged as to whether it contains the specified pattern to be detected). The degree of fit and location, i.e., the position coordinates of the reference point obtained by position detection unit 25', of data concerning effective candidates are stored in memory 65. As part of the judgment processing, the degree of fit obtained in the second embodiment is compared with a threshold value. Data concerning candidates whose degree of fit exceeds the previously established threshold value, for example, 70%, are extracted.

Figure 22A:
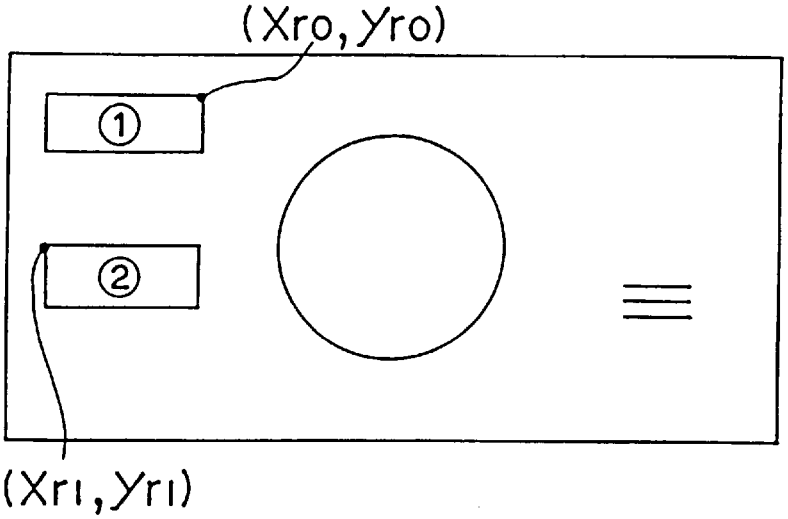
FIGS. 22(A)–22(C) are diagrams illustrating how the device works.
Figure 22B:
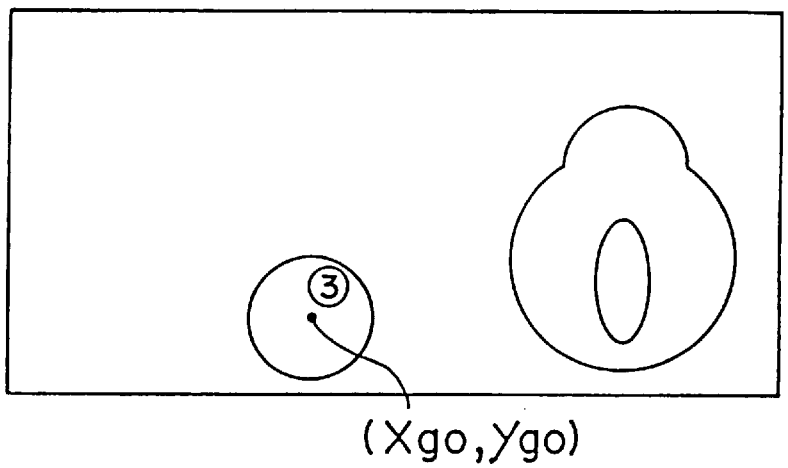
Figure 22C:
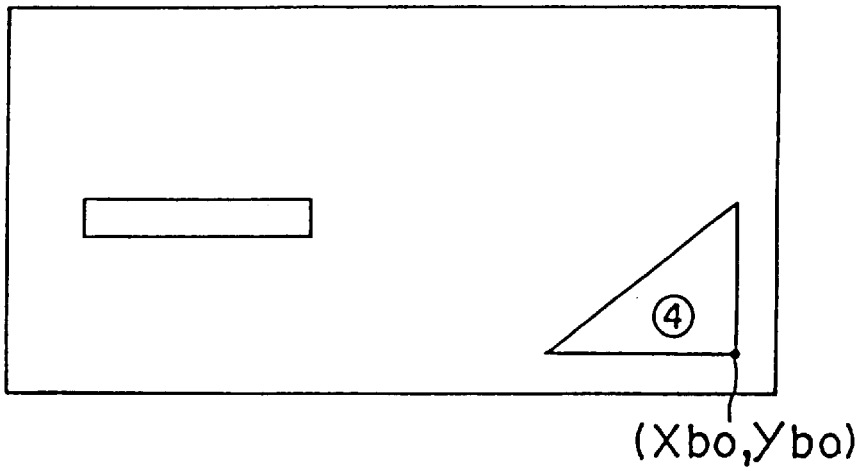

An example is shown in FIGS. 22(A)–22(C). The R, G and B components of the image data are shown in FIGS. 22(A), 22(B) and 22(C), respectively. Pattern extraction device 21 extracts patterns (1) through (4) because of their resemblance to a specified pattern to be detected and sends them to CPU 301. As a result of inferences performed by fuzzy inference unit 35', the degree of fit of pattern (1) with respect to the specified pattern to be detected, i.e., the reference pattern, is found to be 85%, and that of patterns (2) through (4) is found to be 50%, 75% and 80%, respectively.

Figures 23, 24:
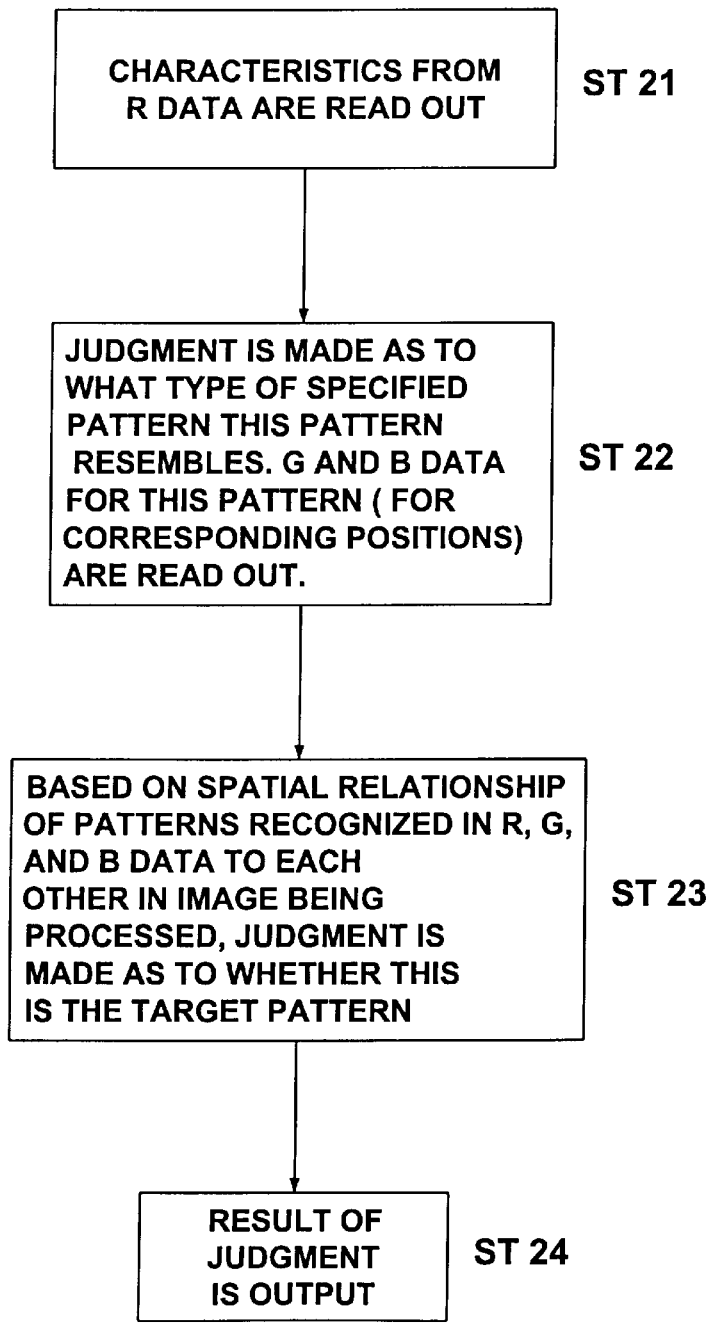
FIG. 23 is a diagram illustrating how data is organized in the memory which stores inference results in the device.
FIG. 24 is a flow chart illustrating the judgment processing performed by the CPU in the device.

Data concerning patterns (1), (3) and (4), whose degree of fit exceeds 70%, making them effective candidates for a match, are stored in memory 65. An example of how these data are organized to be stored is shown in FIG. 23. Degree of fit is stored together with position, i.e., the coordinates of the reference position, and data concerning which specified pattern the candidate resembles are also stored, though they are not included in FIG. 23. If there are a number of effective candidates among the data represented by a single signal, the data concerning each of them are stored as well, as indicated by the parentheses in FIG. 23.

CPU 30' also judges whether the three inference operations, one for R, one for G and one for B, have all been completed. When they have, CPU 301 makes overall judgments of the data concerning the effective candidates stored in memory 65 and renders a final judgment as to whether the image being processed does or does not contain the specified pattern to be detected. It then outputs a specified control signal to the copier or another device (not shown).

Figure 25:
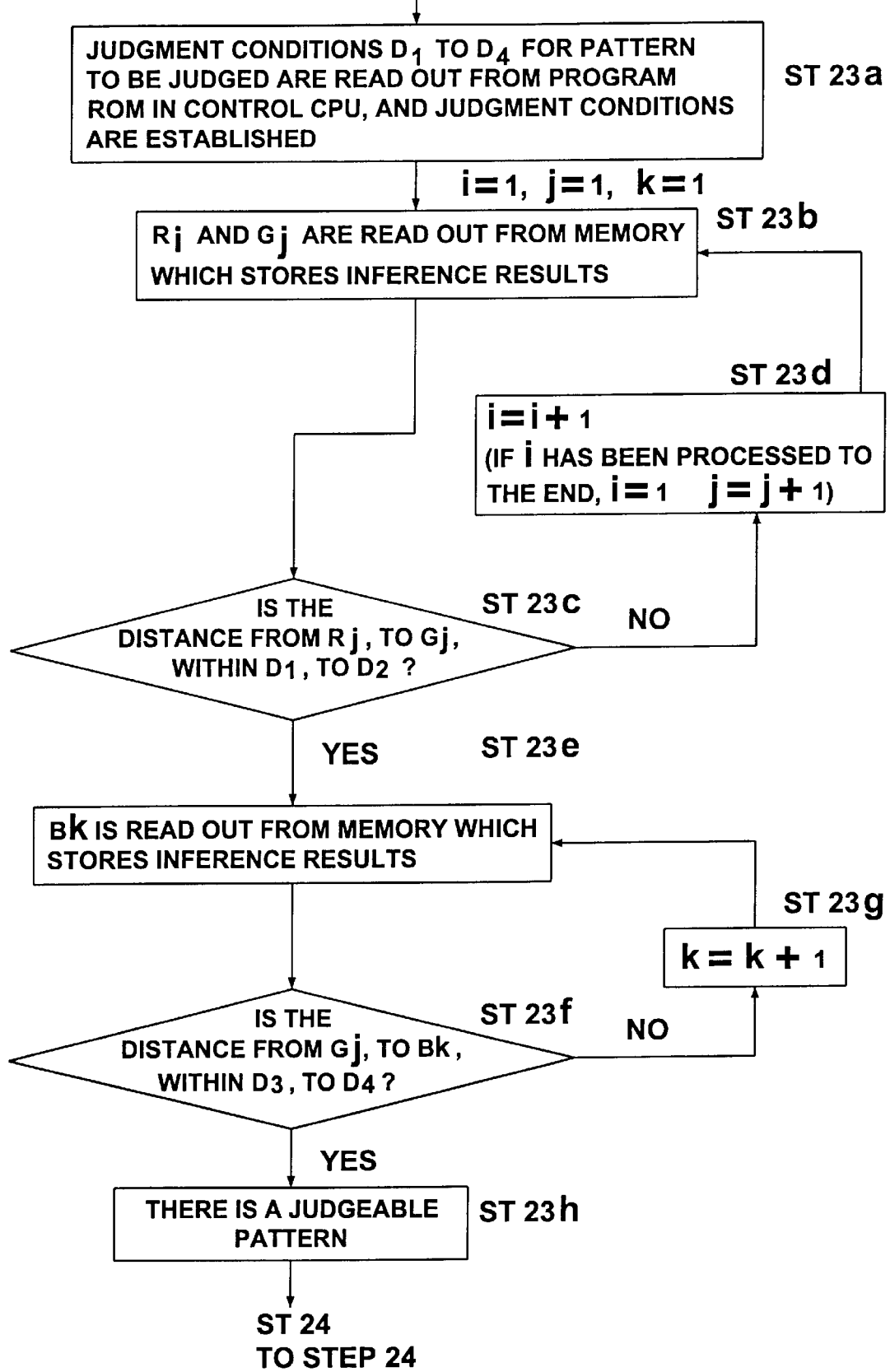
FIG. 25 is another flow chart of the judgment processing performed by the CPU in the device.

The actual steps in this process are shown in FIGS. 24 and 25. The desired signal, for example, the results of inferences concerning the R data (the position coordinates of effective candidates and so on), is read out (Step 21). A table which is stored in program ROM 30' is consulted to determine the relationship between the specified pattern and the image which is to be detected, for example, the denomination of a bill. A determination is made as to what category the pattern in the image being processed appears to belong. The rules are then read out (Step 22) which define the relationship between the position coordinates of the pattern recognized among the R data and those of the pattern recognized among the G data as well as that between the position coordinates of the same pattern in the R data and those of the pattern recognized among the B data. This relationship determines whether these data represent the image which this pattern was determined to be.

Figure 26:
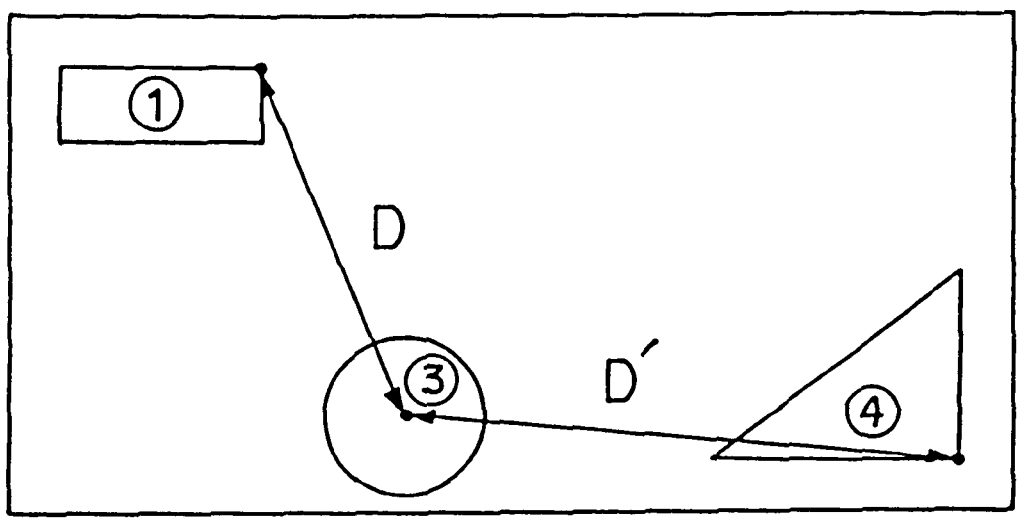
FIG. 26 is a diagram illustrating how the device works.

For the specified pattern to be detected shown in FIG. 26, these rules will be statements such as: "For a certain specified pattern to be detected (which is a bank note), if there is a pattern like Pattern (1) in the R data, there will be a pattern like Pattern (3) in the G data. This pattern will have a reference point which is distance D away from the reference point (i.e., the specified position) of Pattern (1)." "For a certain specified pattern to be detected (which is a bank note), if there is a pattern like Pattern (3) in the G data, there will be a pattern like Pattern (4) in the B data. This pattern will have a reference point which is distance D' away from the reference point, i.e., the specified position, of Pattern (3)." The rules in this example will be valid even in the case of a printing misregister, since both the distances are given in terms of a fixed relationship (for D, that between D1 and D2; for D', that between D3 and D4).

Next, the reference points in the R, G and B data of all the effective candidates are read out of memory 65. A judgment is made, based on the rules read out in the step discussed above, as to whether the image data being processed are or are not those of the specified pattern to be detected. Specifically, the point-to-point distance is obtained from the reference positions associated with any two data sets, and a judgment is made as to whether this distance is one of the fixed distances mentioned above (Step 23).

FIG. 25 shows the flow of judgment processing for the judgment (Step 23) when the two rules given above are used. First, the reference points $((x_{ri}, y_{ri})$ and $(x_{gj}, y_{gj})$, where $i=0, 1, \ldots$, and $j=0, 1, \ldots)$ of the extracted patterns which were recognized in the R and G data are read out. Based on these reference points, distances are obtained for every combination of points. A judgment is then made as to whether these data represent the specified pattern to be detected by determining whether these distances fulfill the formula given below (Steps 23*a* through 23*d*).

$$D_1 \leq [(x_{gj}-x_{ri})^2+(y_{gj}-y_{ri})^2]^{1/2} < D_2$$

If the condition given above is met, the reference points $((X_{bk}, y_{bk})$, where $k=0, 1, \ldots)$ of the extracted pattern which was recognized in the B data are read out. Based on these reference points, distances are obtained for every combination of points. A judgment is then made as to whether these data represent the specified pattern by determining whether these distances fulfill the criterion given below (Steps 23*e* through 23*g*).

$$D_3 \leq [(x_{bk}-x_{gj})^2+(y_{bk}-y_{gj})^2]^{1/2} \leq D_4$$

If the condition given above is also met, the judgment is made that the pattern, i.e., the specified pattern to be detected, has been found, and a specified signal is output (Steps 23*f* and 24). Alternatively, it would be possible to define distances D and D' as fuzzy values and perform the judgment discussed above as a fuzzy inference.

In the second embodiment, even though the R, G and B data are read in field-sequential fashion, specified data (recognized patterns) are extracted after each set of image data is sent. Because the data stored in memory 65 are coded data concerning the coordinates of reference points of recognized patterns, only a small memory capacity is needed. Since inferences are performed by pattern-matching during the readout of the R, G and B image data (in other words, there is no need to wait for all the image data to be read out), the final judgment as to whether this is indeed the specified pattern to be detected can be made quickly. In this example, RGB data were used; however, the invention is equally applicable to CMY data or to various other types of data.

Figure 27:
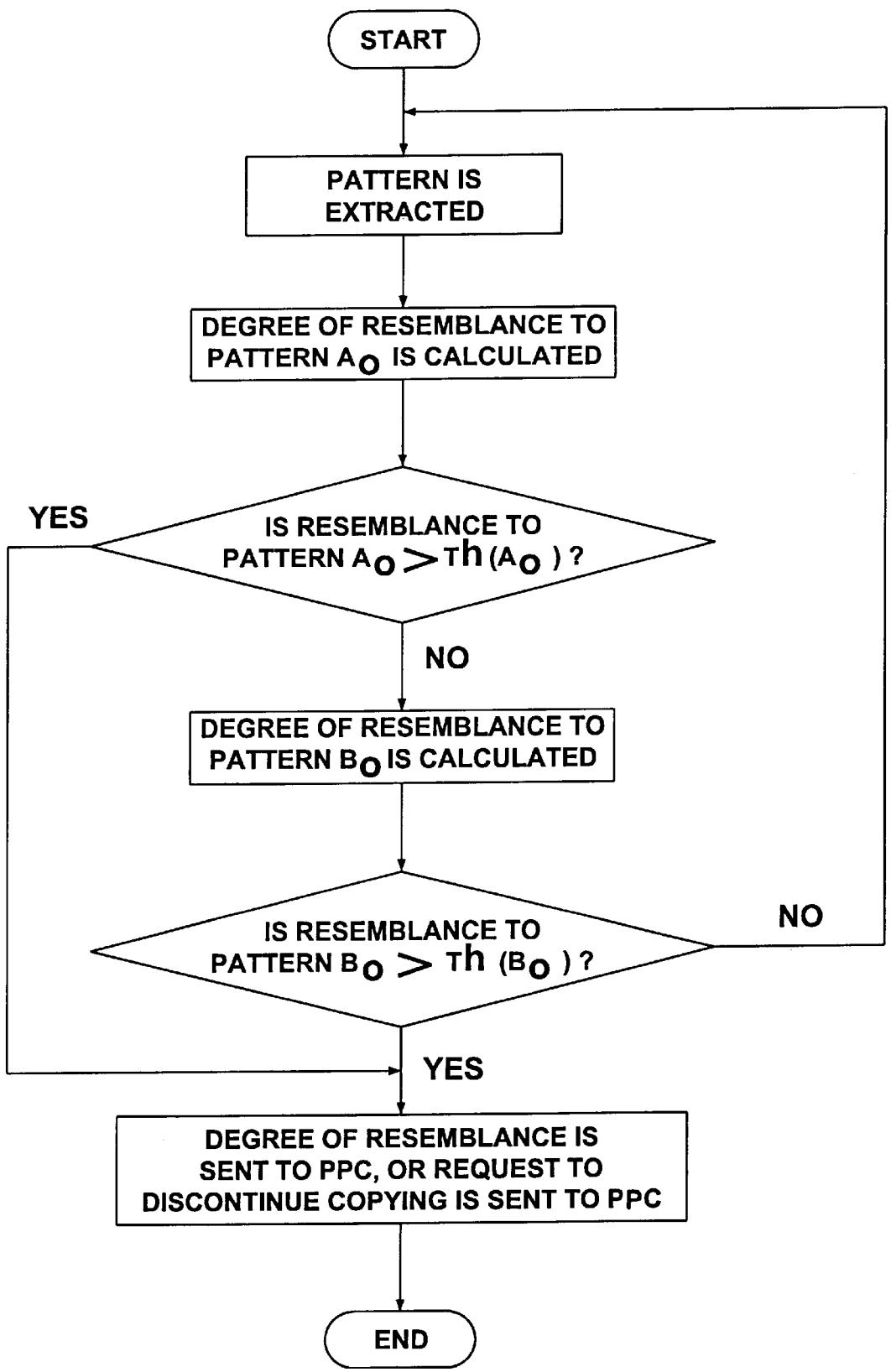
FIG. 27 is a flow chart illustrating the judgment processing performed by the control CPU of a third embodiment of the image processing device of this invention.
Figure 28A:
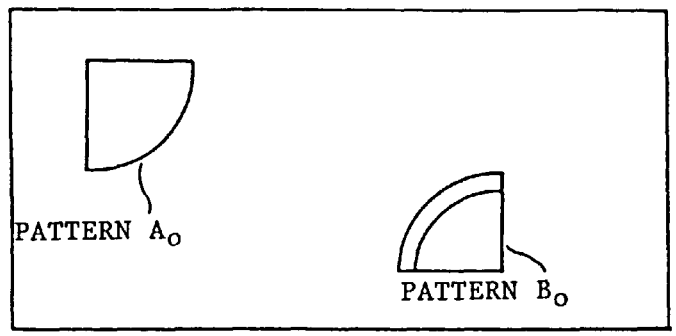
FIGS. 28(A)–28(C) are diagrams illustrating how the device works.
Figures 28B, 28C:
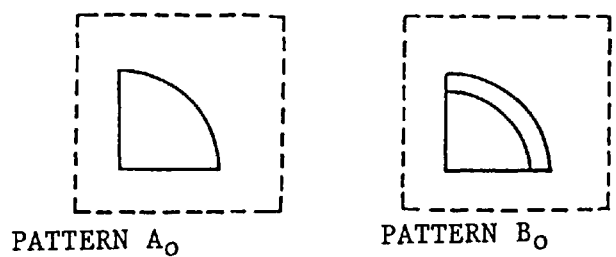

FIGS. 27 and 28(A)–28(B) show the components of a third embodiment of an image processing device designed according to this invention. The third embodiment represents an improvement of pattern matching device 3 in the basic configuration shown in FIG. 1 and, more specifically, in the judging scheme used in CPU 30. The matching operation to detect a given image described above involved choosing as a reference pattern one which most clearly expressed a characteristic and then judging whether a pattern which was found contained an image resembling that reference pattern. In this embodiment, when a single set of image data are judged, a number of previously selected reference patterns in various locations are used, and an overall judgment is made, using OR or AND conditions, as to the degree of resemblance of the image data with respect to each of the reference patterns.

The flow of processing performed by CPU 30 in FIG. 10 is shown in FIG. 27. The two specified patterns shown in FIG. 28(A), A, and $B_0$, are used to generate the characteristic count data which will specify the image to be detected. These patterns are stored ahead of time as reference patterns A, and $B_o$, which are shown in FIGS. 28(B) and 28(C).

The potential matches, i.e., patterns similar to the specified pattern to be detected, which were extracted by extraction device 2 are obtained, and each one is compared with the reference pattern by pattern matching device 3, which then determines its degree of resemblance to the target. If one of the potential matches has a degree of resemblance to the reference pattern which exceeds a specified reference value, that candidate is assumed to contain the specified pattern to be detected, and a specified control signal or a signal indicating the degree of resemblance can be output (See Step 27). In this example, different threshold values (Th $(A_o)$ and Th $(B_o)$) were used for the degree of resemblance to the reference patterns $A_o$ and $B_o$. It would also be possible to use the same threshold value.

Figure 29:
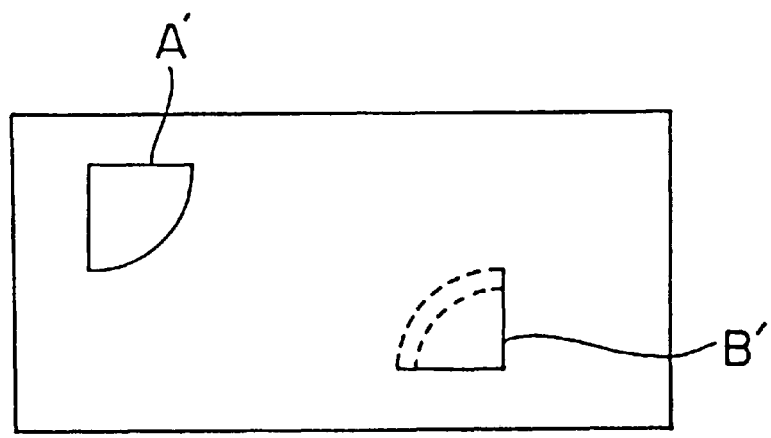
FIG. 29 is another diagram illustrating how the device works.

Let us assume that the pattern being processed consists of a portion of pattern B' shown in FIG. 29. Let us further assume that the degree of resemblance between pattern B' and reference pattern $B_0$ is lower than it should be as a result of a printing error. Since the degree of resemblance of pattern B' is low even though it actually is the image to be detected, it might be missed if only reference pattern B were used to make a judgment, as in previous devices. Since this embodiment uses two reference patterns, and the degree of resemblance of the other pattern, A', to its reference pattern A, will be high, the image can be detected accurately.

In this embodiment the image was judged to contain the specified pattern if a high degree of resemblance was found with respect to one of the reference patterns. However, the invention is not limited to this case only. It would, for example, be possible to conclude that the image contained the specified pattern by using three or more reference patterns and finding that the degree of resemblance to the reference pattern exceeded a specified reference value for a number of these patterns (a value smaller than the total number of reference patterns).

Another acceptable scheme would be to establish at least two values, one high and one low, as references by which to judge the degree of resemblance. If the degree of resemblance exceeded the low value with respect to all or a majority of the reference patterns, and if the degree of resemblance exceeded the high value with respect to at least one of the reference patterns, it could be concluded that the specified pattern to be detected had been found.

In this third embodiment, which was discussed above, the judgment of whether or not the image contains the specified pattern, i.e., the one we hope to detect, is made by judging whether or not it contains a pattern whose degree of resemblance to a certain reference pattern exceeds a specified value. Another embodiment might base the first judgment not only on the degree of resemblance to a number of reference patterns, but also on the spatial relationship between the patterns which have been found.

Figure 30:
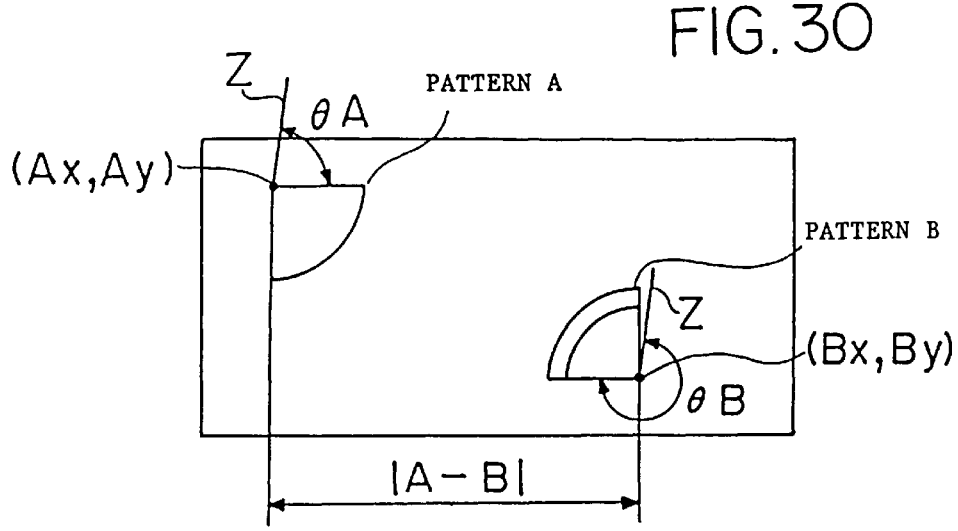
FIG. 30 is a diagram showing a modification of the image processing device of this invention.

Let us assume that the image data we hope to detect are those shown in FIG. 30. Reference patterns A and B are identical to those shown in FIGS. 28(B) and 28(C). In the embodiment discussed above, both patterns C and D in FIG. 31 and patterns E and F in FIG. 32 would show a high degree of resemblance to reference patterns A and B. Both the image shown in FIG. 31 and that shown in FIG. 32 would thus be presumed to be the image to be detected; since both contain the specified pattern. As a result, the processing performed in the copier would be prohibited. However, both the image data shown in FIG. 31 and that shown in FIG. 32 differ from the image to be detected, and as such, they should be permitted to be copied.

When a judgment is made using a number of reference patterns as a basis, and some patterns are detected whose degree of resemblance exceeds a given value, we must obtain the orientation of each pattern we have detected as well as the distance between each pair. A final judgment can then be made by determining whether or not these values are within the same range as those of a reference pattern.

More specifically, we obtain in advance the shapes of the reference patterns to be detected in the image data as well as the distance between them (absolute value A–B) and their angles $\theta A$ and $\theta B$ with respect to parallel reference lines Z (which indicate their orientation), and we store these data.

Figure 33:
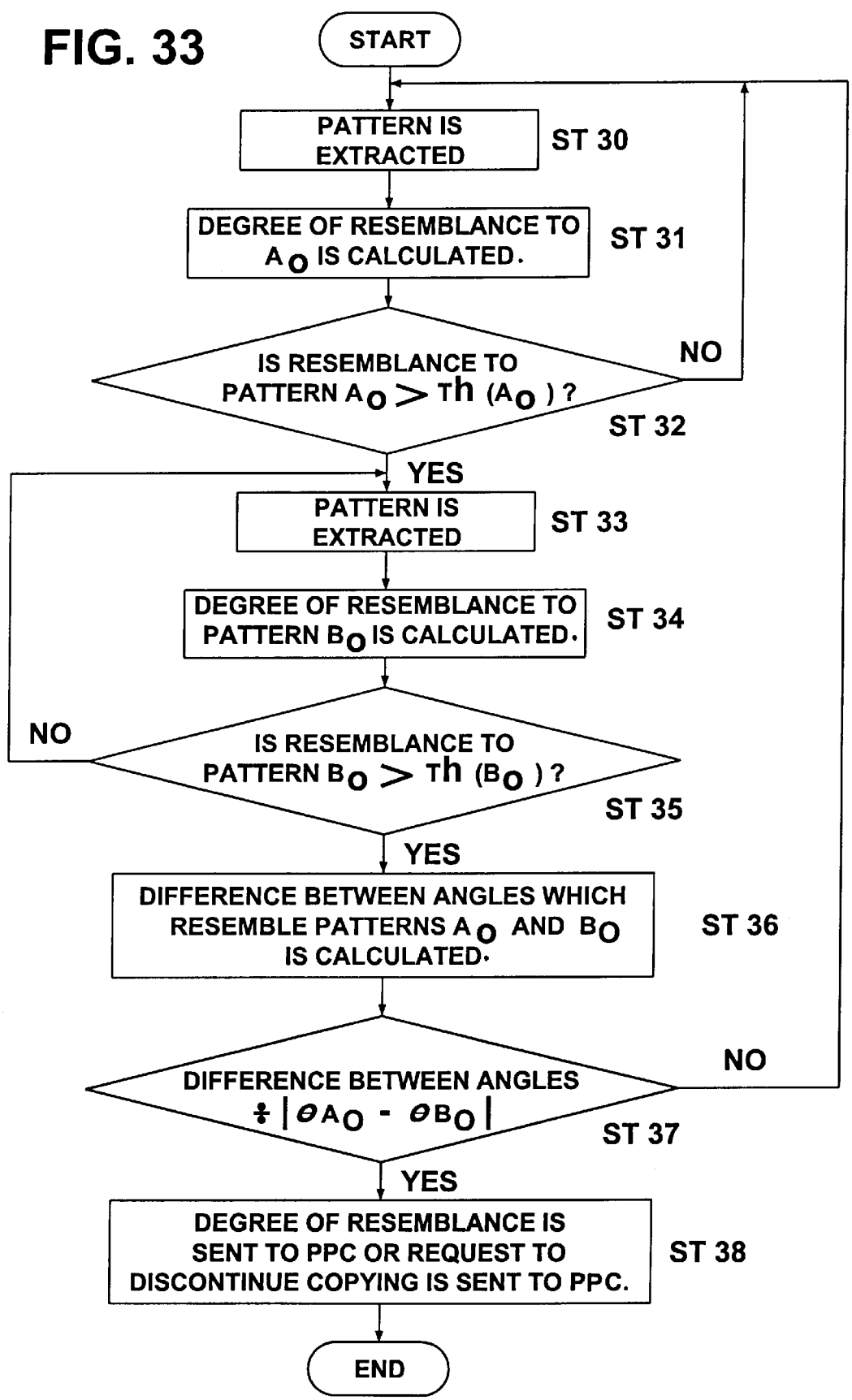
FIG. 33 is a flow chart illustrating the judgment processing performed by the control CPU in the modification.

The sequence of steps in a judgment which uses orientation as a criterion is shown in FIG. 33. First, the degree of resemblance of each pattern extracted by device 2 is determined with respect to both the reference patterns A and B. Judgments are made as to whether these values are greater than the threshold values $Th_{A0}$ and $Th_{B0}$ (Steps 30 to 32).

If the degree of resemblance of both patterns is greater than a given value, angles $\theta C$ and $\theta D$ are obtained for extracted patterns C and D, and the difference between them is also obtained (Steps 33 to 35). A judgment is made as to whether this difference is approximately equal to the difference between the angles of the reference patterns. If it is, the image is judged to be the one being sought, and a specified signal is output (Steps 36 to 38).

Figure 31:
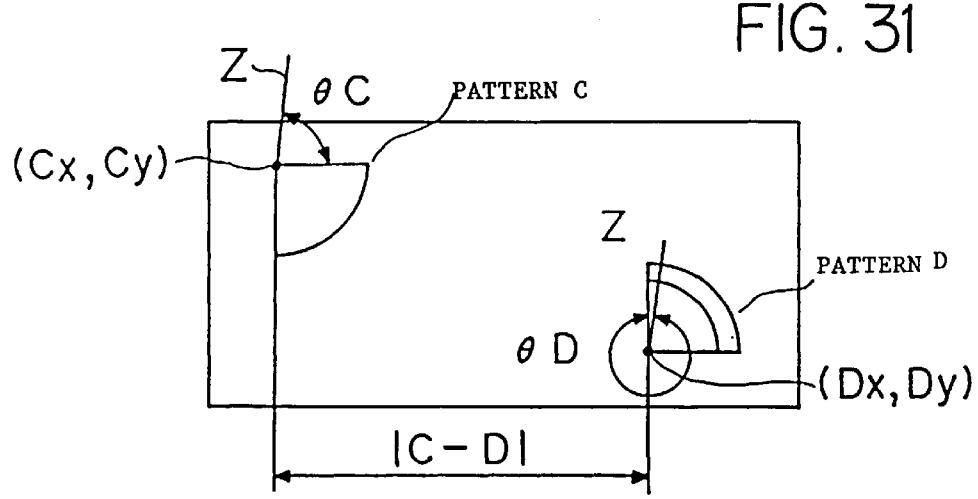
FIG. 31 is a diagram showing another modification of the image processing device of this invention.

Since the difference between the angles of the patterns shown in FIG. 31 will not be equal to the reference value, the image in FIG. 31 will not be mistakenly presumed to be the one we are seeking.

Figure 34:
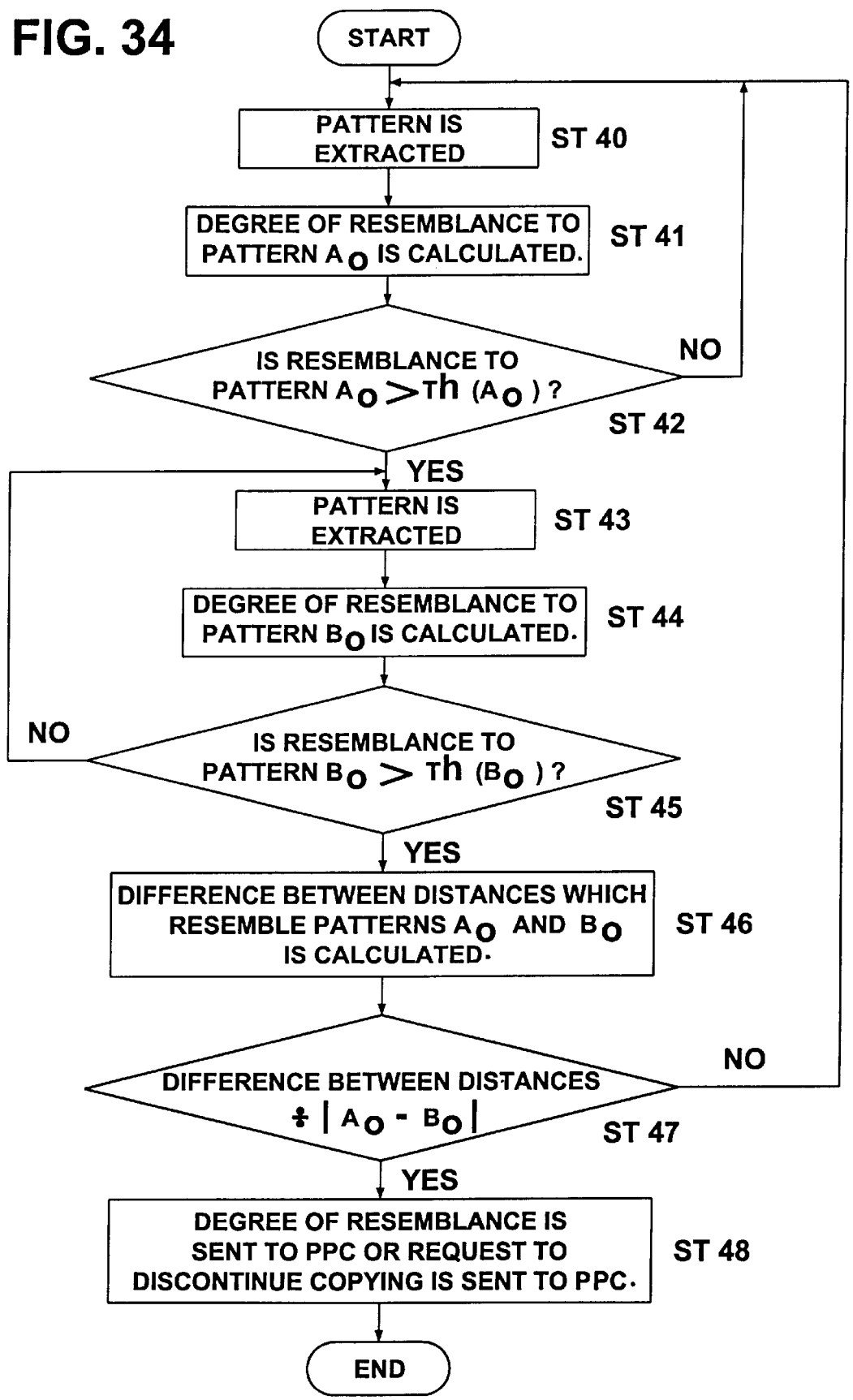
FIG. 34 is a flow chart illustrating the judgment processing performed by the control CPU in another modification of the device.

The sequence of steps in a judgment which uses the distance between patterns as a criterion is shown in FIG. 34. First, the degree of resemblance of each pattern extracted by device 2 is determined with respect to both the reference patterns, A and B. Judgments are made as to whether these values are greater than the threshold values $Th_{A0}$ and $Th_{B0}$ (Steps 40 to 42).

If both values exceed their thresholds, the distance between extracted patterns E and F is obtained (absolute value E–F) (Steps 43 to 45). A judgment is made as to whether the distance between these patterns is approximately equal to the distance between the reference patterns. If it is, the image is judged to be the one being sought, and a specified signal is output (Steps 46 to 48).

Figure 32:
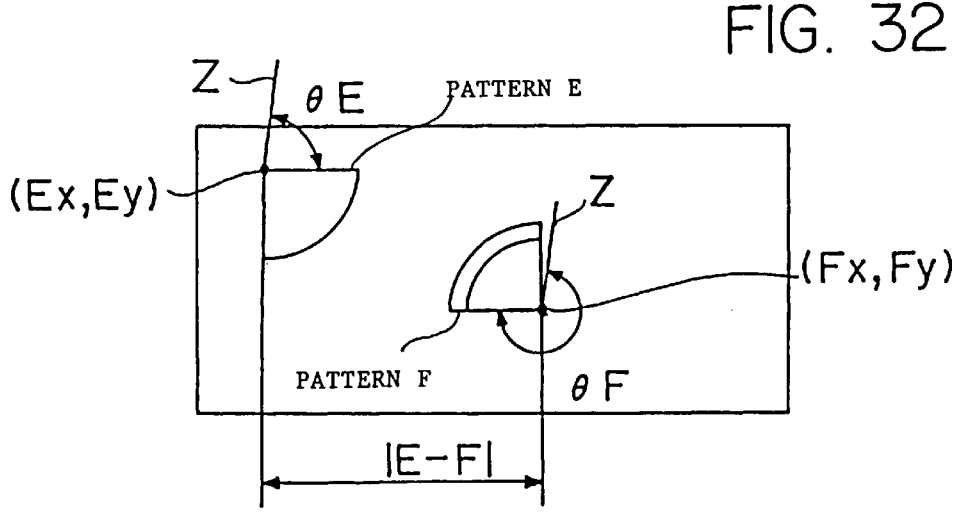
FIG. 32 is a diagram showing yet another modification of the image processing device of this invention.

Since the distance between the patterns in FIG. 32 will not be equal to the reference value, the image in FIG. 32 will not be mistakenly presumed to be the one we are seeking.

The question of which sort of data to use when a judgment is to be based on data concerning the spatial relationship of the patterns as well as their degree of resemblance to reference patterns, as discussed above, is left to the user. Either orientation or distance may be used, or both may be used together, or yet a third criterion may be added to the judgment processing. The relevant processing is performed by CPU 30, which is pictured in FIG. 10.

The embodiments discussed above were all devices suited for use in copy machines. The invention, however, is not limited to this application only. It is also suitable for use in color printers, fax machines, communication transmission devices, and various other types of equipment.

The image processing device of this invention and the copy machine in which it is used have a lower cost than their predecessors because they require only a small-capacity memory. This improvement is a result of the fact that the specified patterns which are detected constitute only a portion of the entire image. Thus these patterns can be detected regardless of the size (i.e., the exterior dimensions) of the document which may not be copied (or printed). Detection is based on whether or not these specified patterns can be found. All processing from detection of possible specified patterns in the first scan to determining their degree of resemblance to a reference pattern can be performed in real time. The specified pattern will not be missed even in a single-scan copy machine, and the recognition rate will be high.

If for every search the received image is gradated and potential matches are compared to the gradated image (or pattern), the image data with the specified pattern to be detected can be extracted quickly and accurately. If after the patterns are detected using the gradated image, one of them is selected to be output based on the spatial relationships among them, the result of using the gradated image for matching will be that spurious data, i.e., data which are not associated with a specified pattern to be detected, can be discarded. Even though extraneous data are collected, they can be barred from subsequent processing, such as being extracted or evaluated for resemblance to a reference pattern. This allows us to reduce the memory capacity and increase the processing speed.

Because the extraction device has the ability to detect certain specified positions, such as the apex of a corner or the center of a circle, in the pattern which has been detected, these positions can be specified accurately in the first stage of processing. This will allow a virtually perfect registration of the detected pattern with the reference pattern when a degree of resemblance is to be determined. If a specified position cannot be detected, the judgment can be made that the image being processed cannot be the specified pattern to be detected. The degree of resemblance then need not be calculated, resulting in a further increase in processing speed.

Because the device which calculates the degree of resemblance performs fuzzy inferences using a number of items of fuzzy knowledge created from one of the reference patterns established in advance, erroneous judgments resulting from the image being slightly shifted in printing can be effectively avoided with no loss in processing speed.

Because the device which detects the pattern, the device which extracts the pattern and the device which calculates its degree of resemblance to a reference all process the data as soon as a set of data for a color component arrives in field-sequential fashion; and because a judgment is based on the spatial relationship of the potential matches detected in these data, then the patterns can be matched as soon as a data set is received, even though the data are analyzed into RGB, CMY, or some other set of components. Since the spatial relationship of the patterns to each other is a criterion for a high degree of resemblance, there is no need to wait for the later fields of the image to be read out so that all the color data are sent. The various types of processing needed to make judgments are performed in parallel with the readout of data for each color. As a result, judgments can be produced at high speed and a small-capacity memory can be used.

Because reference patterns are provided which correspond to a number of patterns in the image data for a single image, and because judgments are based on all of these reference patterns, the desired image can be detected accurately even when the degree of resemblance of a portion corresponding to one reference pattern is low as the result of unevenness or alteration of the print. This can be done by comparing another detected pattern to its reference pattern. The spatial relationships among a number of reference patterns are used as a criterion for a judgment. This insures that an image containing a pattern which is identical to a reference pattern but is located in a different part of the image will not be mistakenly identified as the image being searched for.

By installing this image processing device in a copy machine, we can absolutely prevent the output of copies of documents whose reproduction is illegal, such as bank notes and negotiable securities.

What is claimed is:

1. An image processing device for identifying an input image of documents not intended for reproduction, said image processing device comprising:

image detecting means for detecting a candidate pattern in said input image which resembles a specified pattern, aid image detecting means comprises a pattern matching means for pattern-matching a gradated candidate pattern formed from said candidate pattern with a gradated reference pattern formed from said specified pattern to perform a rough search for a location of said candidate pattern;

image extracting means for extracting said candidate pattern from said input image; and calculating means for calculating a degree of resemblance between a predetermined reference pattern and said extracted candidate pattern;

wherein said detecting means, said extracting means and said calculating means operate on a same scan of an image obtained by only a single scan of said input image.

2. An image processing device according to claim 1, wherein said pattern matching means obtains a plurality of candidate patterns based on a plurality of matching results and said image detecting means further comprises:

pattern selecting means for selecting a single specific candidate pattern out of said plurality of candidate patterns and outputting said input image containing said single specific candidate pattern to said image extracting means.

3. An image processing device according to claim 1, wherein said image extracting means comprises a location detecting means for detecting a specified location of said candidate pattern detected by said image detecting means.

4. An image processing device according to claim 1, wherein said calculating means calculates said degree of resemblance by performing fuzzy inferences using a relevant fuzzy knowledge of said predetermined reference pattern.

5. An image processing device according to claim 1, wherein:

said extracting means forwards an image data of said candidate pattern into a memory; and said calculating means determines if said image data of said candidate pattern in said memory matches with said specified pattern, said calculating means operating independently of said detecting means.

6. An image processing device according to claim 1, wherein said input image comprises a plurality of color components and wherein said image detecting means, said image extracting means, and said calculating means each operate using a field-sequential scheme to process a respective data set received for each of said color components, said image processing device further comprising:

first judging means for selecting an effective candidate pattern out of a plurality of said candidate patterns and forwarding location data of said effective candidate pattern, said effective candidate pattern having a high degree of resemblance calculated by said calculating means; and second judging means for judging overall if said effective candidate pattern is located in a correct position based on said location data for each of said color components and if said effective candidate pattern is recognized as said specific pattern.

7. An image processing device according to claim 1, wherein said calculating means comprises:

means for providing a plurality of reference patterns corresponding to a plurality of specified patterns located in various locations of a target image;

means for calculating a plurality of degrees of resemblance between a plurality of extracted candidate patterns extracted by said image extracting means and said plurality of reference patterns; and means for judging said input image as a target image to be identified if said extracted candidate patterns exceed a predetermined degree of resemblance more than a predetermined number of times.

8. An image processing device according to claim 1, wherein said calculating means comprises:

means for providing a plurality of reference patterns corresponding to a plurality of specified patterns located in various locations of a target image;

means for calculating a plurality of degrees of resemblance between a plurality of extracted candidate patterns extracted by said image extracting means and said plurality of reference patterns;

means for recognizing said extracted candidate patterns as effective candidate patterns if said extracted candidate patterns have a high degree of resemblance; and means for judging said input image as a target image to be identified based on a mutual spatial relationship between said extracted candidate patterns.

9. A copier comprising:

scanning means for scanning an original image to produce as in input image;

a signal processing unit including a color processing means for producing color component data from the input image and an image processing device, said image processing device comprising:

image detecting means for detecting a candidate pattern in said input image which resembles a specified pattern, said image detecting means comprises a pattern matching means for pattern-matching a gradated candidate pattern formed from said candidate pattern with a gradated reference pattern formed from said specified pattern to perform a rough search for a location of said candidate pattern;

image extracting means for extracting said candidate pattern from said input image; and calculating means for calculating a degree of resemblance between a predetermined reference pattern and said extracted candidate pattern;

wherein said detecting means, said extracting means and said calculating means operate on a same scan of an image obtained by only a single scan of said input image;

decision means for deciding if said original image is obtained from a predetermined object such as a bank note; and copy prevention means for generating a control signal in accordance with a decision made by said decision means and preventing copying of said original image.

10. A copier according to claim 9, wherein said pattern matching means obtains a plurality of candidate patterns based on a plurality of matching results and said image detecting means further comprises:

pattern selecting means for selecting a single specific candidate pattern out of said plurality of candidate patterns and outputting said input image containing said single specific candidate pattern to said image extracting means.

11. A copier according to claim 9, wherein said image extracting means comprises a location detecting means for detecting a specified location of said candidate pattern detected by said image detecting means.

12. A copier according to claim 9, wherein said calculating means calculates said degree of resemblance by performing fuzzy inferences using a relevant fuzzy knowledge of said predetermined reference pattern.

13. A copier according to claim 9, wherein:

said extracting means forwards an image data of said candidate pattern into a memory; and said calculating means determines if said image data of said candidate pattern in said memory matches with said specified pattern, said calculating means operating independently of said detecting means.

14. A copier according to claim 9, wherein said input image comprises a plurality of color components and wherein said image detecting means, said image extracting means, and said calculating means each operate using a field-sequential scheme to process a respective data set received for each of said color components, said image processing device farther comprising:

first judging means for selecting an effective candidate pattern out of a plurality of said candidate patterns and forwarding location data of said effective candidate pattern, said effective candidate pattern having a high degree of resemblance calculated by said calculating means; and second judging means for judging overall if said effective candidate pattern is located in a correct position based on said location data for each of said color components and if said effective candidate pattern is recognized as said specific pattern.

15. A copier according to claim 9, wherein said calculating means comprises:

means for providing a plurality of reference patterns corresponding to a plurality of specified patterns located in various locations of a target image;

means for calculating a plurality of degrees of resemblance between a plurality of extracted candidate patterns extracted by said image extracting means and said plurality of reference patterns; and means for judging said input image as a target image to be identified if said extracted candidate patterns exceed a predetermined degree of resemblance more than a predetermined number of times.

16. A copier according to claim 9, wherein said calculating means comprises:

means for providing a plurality of reference patterns corresponding to a plurality of specified patterns located in various locations of a target image;

means for calculating a plurality of degrees of resemblance between a plurality of extracted candidate patterns extracted by said image extracting means and said plurality of reference patterns;

means for recognizing said extracted candidate patterns as effective candidate patterns if said extracted candidate patterns have a high degree of resemblance; and means for judging said input image as a target image to be identified based on a mutual spatial relationship between said extracted candidate patterns.

* * * * *